US010663016B2

(12) United States Patent
Schmitz et al.

(10) Patent No.: US 10,663,016 B2
(45) Date of Patent: May 26, 2020

(54) ELECTROSTATIC ROTARY CLUTCH

(71) Applicant: Microsoft Technology Licensing, LLC, Redmond, WA (US)

(72) Inventors: Aaron Schmitz, Redmond, WA (US); Jonathan Shea Robinson, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 73 days.

(21) Appl. No.: 15/728,288

(22) Filed: Oct. 9, 2017

(65) Prior Publication Data
US 2019/0107157 A1 Apr. 11, 2019

(51) Int. Cl.
| *F16D 13/52* | (2006.01) |
| *F16D 28/00* | (2006.01) |
| *F16D 13/64* | (2006.01) |
| *H02N 13/00* | (2006.01) |
| *A63F 13/24* | (2014.01) |

(52) U.S. Cl.
CPC ............ *F16D 28/00* (2013.01); *F16D 13/52* (2013.01); *F16D 13/648* (2013.01); *H02N 13/00* (2013.01); *A63F 13/24* (2014.09)

(58) Field of Classification Search
CPC ...... F16D 13/52; F16D 13/648; F16D 37/008; H02N 13/00
See application file for complete search history.

(56) References Cited

U.S. PATENT DOCUMENTS 3,356,195 A 12/1967 Hale et al.
3,871,944 A * 3/1975 Dominguez-Burguette ................
F16D 63/002
428/66.2

(Continued)

FOREIGN PATENT DOCUMENTS

DE 10119509 A1 10/2002
GB 617228 A * 2/1949 ........... F16D 37/008

(Continued)

OTHER PUBLICATIONS

SRI International, "Electroadhesion" article, retrieved from www.sri.com (Year: 2019).*

(Continued)

*Primary Examiner* — Stacey A Fluhart
(74) *Attorney, Agent, or Firm* — Fiala & Weaver P.L.L.C.

(57) ABSTRACT

Methods, systems, apparatuses, and devices are provided for an electrostatic rotary clutch. The clutch comprises electrically-conductive housing plates fixed into position in grooves within a housing of the clutch. The clutch also comprises rotor plates that are fixed onto a shaft. The shaft is positioned within the housing such that each rotor plate is adjacently positioned next to each housing plate, thereby forming a plurality of electrically-conductive plate pairs. To produce a torque resistance on the shaft, a voltage differential is applied between the housing and rotor plates, which causes an electrostatic adhesion between the housing and rotor plate in each electrically-conductive plate pair. Alternatively, the housing and rotor plates are not fixed into position, enabling a greater number of housing and rotor plates within the housing and increasing the torque resistance produced on the shaft when applying the voltage differential.

20 Claims, 15 Drawing Sheets

(56) References Cited

U.S. PATENT DOCUMENTS

| | | | | |
|---|---|---|---|---|
| 4,896,754 | A | * | 1/1990 | Carlson ................ F16D 37/008 188/267.1 |
| 4,965,429 | A | | 10/1990 | Polstorff |
| 5,094,328 | A | * | 3/1992 | Palmer ................ F16D 37/008 188/274 |
| 5,508,327 | A | | 4/1996 | Cipriano et al. |
| 5,620,071 | A | * | 4/1997 | Ishikawa ................ F16D 28/00 192/21.5 |
| 5,730,259 | A | * | 3/1998 | Umezawa ................ F16D 13/648 188/250 B |
| 6,084,321 | A | | 7/2000 | Hunter et al. |
| 6,497,149 | B1 | | 12/2002 | Moreau et al. |
| 7,365,463 | B2 | | 4/2008 | Horst et al. |
| 8,638,024 | B2 | | 1/2014 | Anderson et al. |
| 8,679,040 | B2 | | 3/2014 | Horst |
| 2002/0166745 | A1 | * | 11/2002 | Szalony ................ F16D 37/008 192/21.5 |
| 2002/0175598 | A1 | | 11/2002 | Heim et al. |
| 2004/0129380 | A1 | | 7/2004 | Murphy et al. |
| 2011/0132713 | A1 | * | 6/2011 | Biegger ................ F16D 28/00 192/66.1 |
| 2013/0088117 | A1 | | 4/2013 | Boughtwood |
| 2014/0329640 | A1 | | 11/2014 | Helmer et al. |
| 2016/0017940 | A1 | | 1/2016 | Eckerle |
| 2016/0101517 | A1 | | 4/2016 | Kornbluh et al. |

FOREIGN PATENT DOCUMENTS

| | | | | |
|---|---|---|---|---|
| GB | 985827 | A | * 3/1965 | ............. B23Q 3/154 |
| JP | H1026150 | A | 1/1998 | |
| JP | H1030654 | A | 2/1998 | |
| WO | 2016057963 | A1 | 4/2016 | |

OTHER PUBLICATIONS

"International Search Report and Written Opinion Issued in PCT Application No. PCT/US2018/054051", dated Jan. 4, 2019, 13 Pages.

* cited by examiner

Configure a first torque resistance for a shaft by applying a first voltage difference across a plurality of first plates and a plurality of second plates axially mounted to the shaft and contained in a housing, each second plate of the plurality of second plates positioned adjacent to a corresponding first plate of the plurality of first plates to form a substantially parallel plurality of electrically-conductive plate pairs contained in the housing, each first plate of the plurality of the first plates being rotationally-coupled to the housing, each second plate of the plurality of second plates being rotationally-coupled to the shaft, said applying the first voltage difference causing a first electrostatic adhesion between corresponding first and second plates of the substantially parallel plurality of electrically-conductive plate pairs

2102

Configure a second torque resistance for the shaft by applying a second voltage difference across the plurality of first plates and the plurality of second plates, said applying the second voltage difference causing a second electrostatic adhesion between corresponding first and second plates of the substantially parallel plurality of electrically-conductive plate pairs

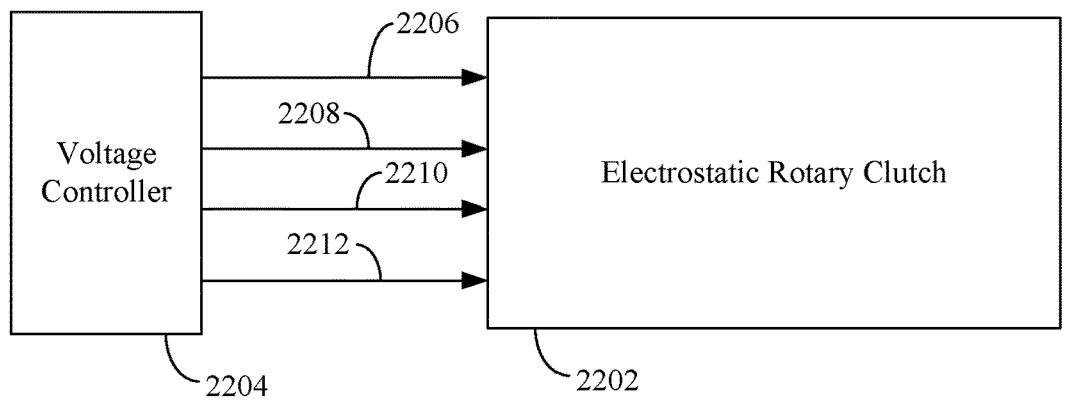

FIG. 22

US 10,663,016 B2

ELECTROSTATIC ROTARY CLUTCH

BACKGROUND

A rotary clutch is a device that translates or resists rotary motion or torque between two or more members (e.g., rotary members, non-rotary members, etc.). It is used in a variety of industrial and consumer applications, such as robotics, haptics, and other applications. The simplest clutch device relies on mechanical friction to resist rotary motion. Other clutch devices are electromagnetic-based. However, such clutches generally use a significant amount of power, generate a lot of heat and are not suitable for low-powered and battery-operated devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and devices are provided for an electrostatic rotary clutch. In accordance with an embodiment, the electrostatic rotary clutch comprises a plurality of electrically-conductive housing plates fixed into position by being placed into a plurality of grooves within a housing of the electrostatic rotary clutch. The electrostatic rotary clutch also comprises a plurality of rotor plates that are fixed onto a shaft. The shaft is positioned within the housing such that each rotor plate is adjacently positioned next to each housing plate, thereby forming a plurality of electrically-conductive plate pairs. To produce a torque resistance on the shaft, a voltage differential is applied between the plurality of housing plates and the plurality of rotor plates, which causes an electrostatic adhesion between the housing plate and the rotor plate in each electrically-conductive plate pair. In accordance with another embodiment, the plurality of housing plates and the rotor plates are not fixed into position, enabling a greater number of housing plates and rotor plates to be placed within the housing and enabling both the housing plates and the rotor plates to move laterally along the length of the shaft.

The embodiments described herein advantageously produce and/or change a torque resistance with relatively low power. Moreover, the embodiments described herein do not suffer from cogging issues found in conventional rotary clutches (e.g., electromagnetic rotary clutches), which comprise copper windings and magnets that cause magnetic fields that impede the performance of such rotary clutches.

Further embodiments, including features and advantages thereof, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 21 shows a flowchart of a method for configuring a torque resistance of a shaft of an electrostatic rotary clutch, according to an example embodiment.

FIG. 22 is a block diagram of an electrostatic rotary clutch coupled to a voltage controller in accordance with an example embodiment.

Figure 1A:
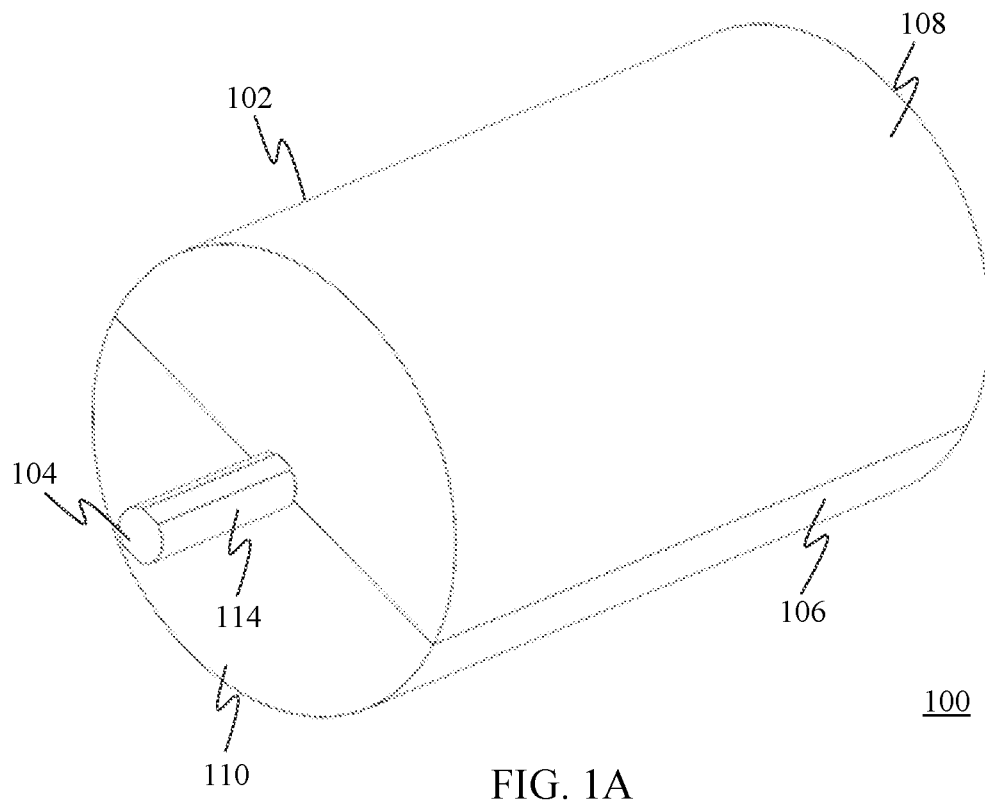
FIGS. 1A and 1B show perspective front and back views of an example electrostatic rotary clutch in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal." etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for an Electrostatic Rotary Clutch

Methods, systems, apparatuses, and devices are described herein for an electrostatic rotary clutch. In accordance with an embodiment, the electrostatic rotary clutch comprises a plurality of electrically-conductive housing plates fixed into position by being placed into a plurality of grooves within a housing of the electrostatic rotary clutch. The electrostatic rotary clutch also comprises a plurality of rotor plates that are fixed onto a shaft. The shaft is positioned within the housing such that each rotor plate is adjacently positioned next to each housing plate, thereby forming a plurality of electrically-conductive plate pairs. To produce a torque resistance on the shaft, a voltage differential is applied between the plurality of housing plates and the plurality of rotor plates, which causes an electrostatic adhesion between the housing plate and the rotor plate in each electrically-conductive plate pair. In accordance with another embodiment, the plurality of housing plates and the rotor plates are not fixed into position, enabling a greater number of housing plates and rotor plates to be placed within the housing and enabling both the housing plates and the rotor plates to move laterally along the length of the shaft.

The embodiments described herein advantageously enable a rotary clutch to generate and/or change a torque resistance with relatively low power. Moreover, the embodiments described herein do not suffer from cogging issues found in conventional rotary clutches (e.g., electromagnetic rotary clutches), which comprise copper windings and magnets that cause magnetic fields that impede the performance of such rotary clutches.

Electrostatic rotary clutch embodiments may be incorporated in any of a variety of devices, including tools, toys, electronic devices including televisions, mobile phones, laptops, tablets, and desktop computers, vehicles, lawn and agricultural equipment, appliances, vehicles, locking and latching mechanisms, etc.

In accordance with an embodiment, the electrostatic rotary clutch may be included in a video game controller. For example, a button (e.g., a trigger button) may be coupled to the electrostatic rotary clutch. In accordance with such an example, the shaft of the electrostatic rotary clutch may rotate as the trigger button is pushed down by a user. The rotation of the shaft may be halted upon detection of a particular event that occurs within a video game, thereby preventing the user from pushing the trigger down any further.

In accordance with another embodiment, the electrostatic rotary clutch may be coupled to a hinge mechanism used to prop up a monitor (e.g., the Zero-Gravity Hinge™ used for the Surface Studio™ computer by Microsoft Corporation®). For example, the electrostatic rotary clutch may be used to control the friction or resistance of the hinge and/or used to lock and/or unlock the hinge in place.

It is noted that the examples provided above are purely exemplary and that the electrostatic rotary clutch embodiments described herein may be used in any application in which the position of a rotational mechanism is to be held.

Exemplary embodiments are described in detail as follows.

A. An Electrostatic Rotary Clutch Comprising Fixed Housing Plates

Figure 1B:
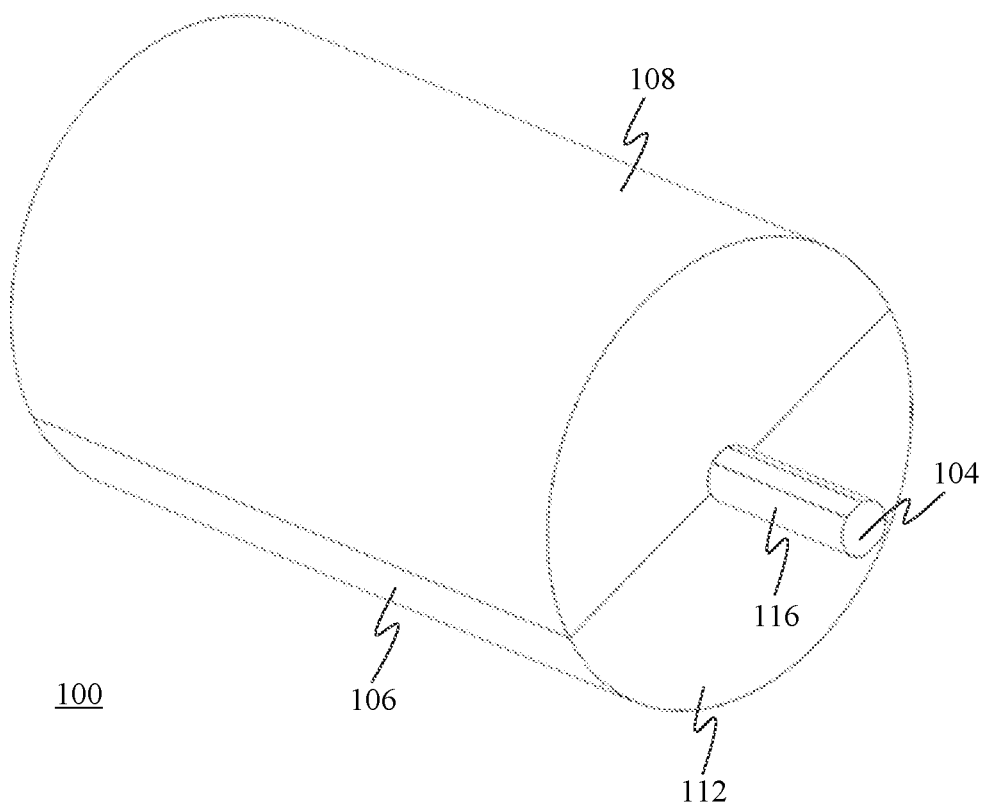

FIGS. 1A and 1B show perspective front and back views of an example electrostatic rotary clutch 100 in accordance with an embodiment. As shown in FIGS. 1A and 1B, electrostatic rotary clutch 100 includes a housing 102 and a shaft 104. Housing 102 may comprise a bottom portion 106 and a top portion 108 that each have the shape of a half-cylinder, and that form a full cylinder having a cylindrical internal cavity when connected together. Housing 102 partially houses shaft 104 in the internal cavity such that a first exposed portion 114 of shaft 104 protrudes from a first side 110 of housing 102 and a second exposed portion 116 of shaft 104 protrudes from a second side 112 of housing 102. Housing 102 may be manufactured from any suitable material(s). For example, housing 102 may be comprised at least in part of material(s) that act as an insulator, such as plastic (e.g., injection molded), rubber, etc. Shaft 104 is configured to be coupled to rotary mechanism (not shown), such as, but not limited to, a gear, a pulley, an axle, a motor, etc. Shaft 104 may comprise an electrically-conductive material, such as, a metal (e.g., copper, aluminum, titanium, etc.) or combination of metals/alloy (e.g., steel).

It is noted that while FIGS. 1A and 1B show shaft 104 protruding from housing 102 from first side 110 and second side 112, in certain embodiments, shaft 104 may only protrude from one of first side 110 or second side 112. In some embodiments, a gear or other torque transmission mechanism may be coupled to shaft 104 internal to housing 102 and shaft 104 may not protrude from housing 102. It is further noted that while housing 102 is shown as having a cylindrical shape, housing 102 may be any shape. Furthermore, housing 102 may be formed from any suitable number of portions and may be divided in different ways than bottom and top portions 106 and 108 (e.g., first and second end portions, etc.).

Figure 2:
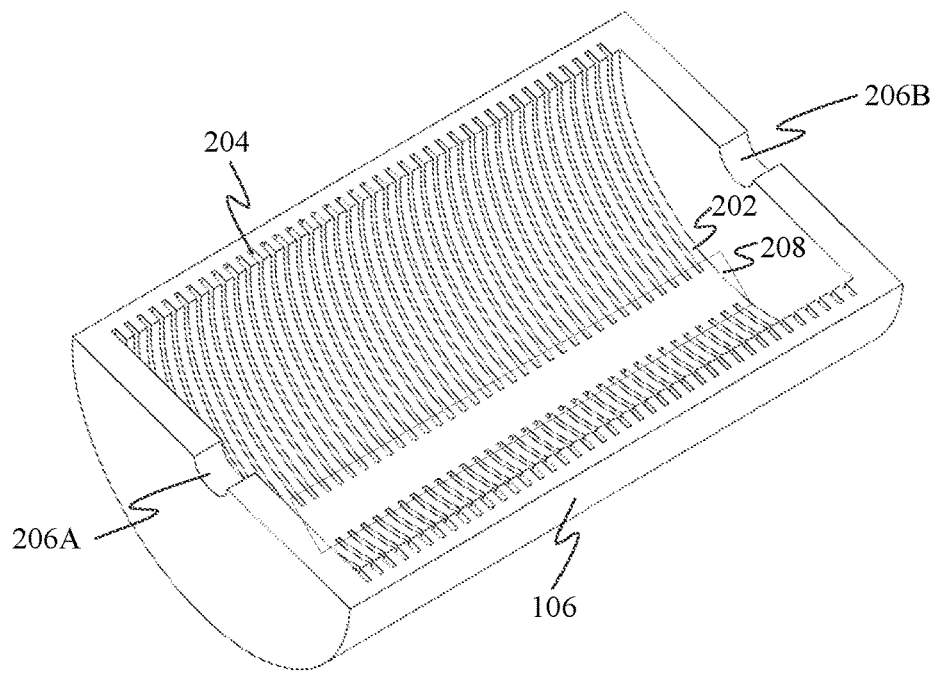
FIG. 2 shows a perspective view of an interior of a bottom portion of a housing of the electrostatic rotary clutch in accordance with an embodiment.

The interior of housing 102 includes additional features and components. For example, FIG. 2 shows a perspective view of an interior of bottom portion 106. Bottom portion 106 and top portion 108 may be identical in size, structure, and/or features, or may be different in size, structure, and/or features. Thus, bottom portion 106 of FIG. 2 may also be representative of top portion 108. As shown in FIG. 2, bottom portion 106 comprises an interior surface 202 that includes a plurality of grooves 204, with each groove being circular and residing between adjacent circular ridges formed in interior surface 202. Each groove of the plurality of grooves 204 is formed to receive and hold stationary a housing plate (described below with reference to FIG. 3). Plurality of grooves 204 intersect with a raised rib-like structure 208 that extends a length of the interior surface of bottom portion 106 and protrudes from interior surface 202. As shown in FIG. 2, each groove of the plurality of grooves 204 spans the entire width of housing 102; however, in some embodiments some or all grooves of the plurality of grooves 204 may be segmented and cover only part of the width of housing 102. Bottom portion 106 also has an aperture 206A and an aperture 206B formed at opposing ends, which are formed to receive shaft 104.

Figure 3:
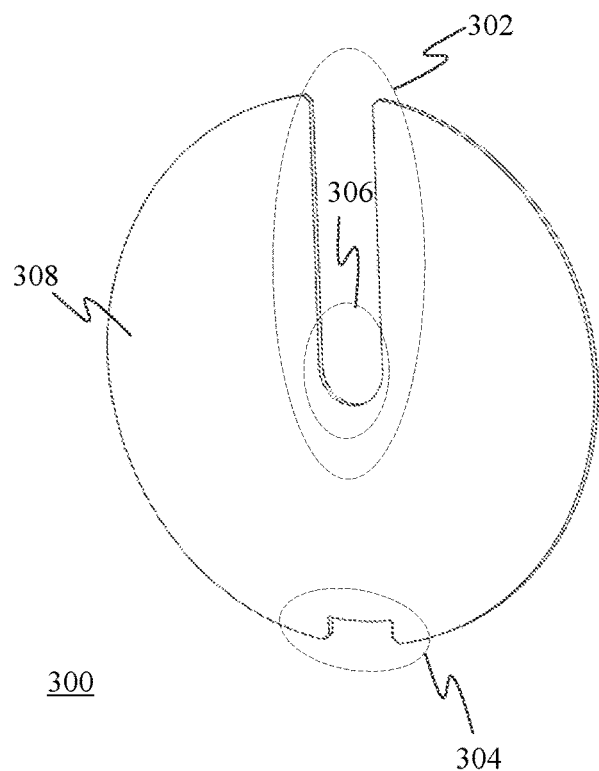
FIG. 3 shows a perspective view of a housing plate in accordance with an example embodiment.

FIG. 3 shows a perspective view of a housing plate 300 in accordance with an example embodiment. As shown in FIG. 3, housing plate 300 comprises a first surface 308 and a second surface (shown in FIG. 12) that opposes first surface 308. Housing plate 300 is planar and may have a substantially circular shape, but the embodiments described herein are not so limited. Housing plate 300 is formed so that its peripheral edge fits in a groove of plurality of grooves 204. As also shown in FIG. 3, housing plate 300 has a first aperture 302 and a second aperture 304 at opposing ends of its peripheral edge. Aperture 302 has a rounded end portion 306 that is centrally-located within housing plate 300. Aperture 302 is formed to receive shaft 104 such that housing plate 300 is axially-mounted to shaft 104. Rounded end portion 306 is configured to be axially-aligned with apertures 206A and 206B when housing plate 300 is inserted into a groove of plurality of groves 204. Aperture 304 is formed to receive rib-like structure 208. Housing plate 300 can be made from any suitable electrically-conductive material, such as, a metal (e.g., copper, aluminum, titanium, etc.) or combination of metals/alloy (e.g., steel).

Figure 4:
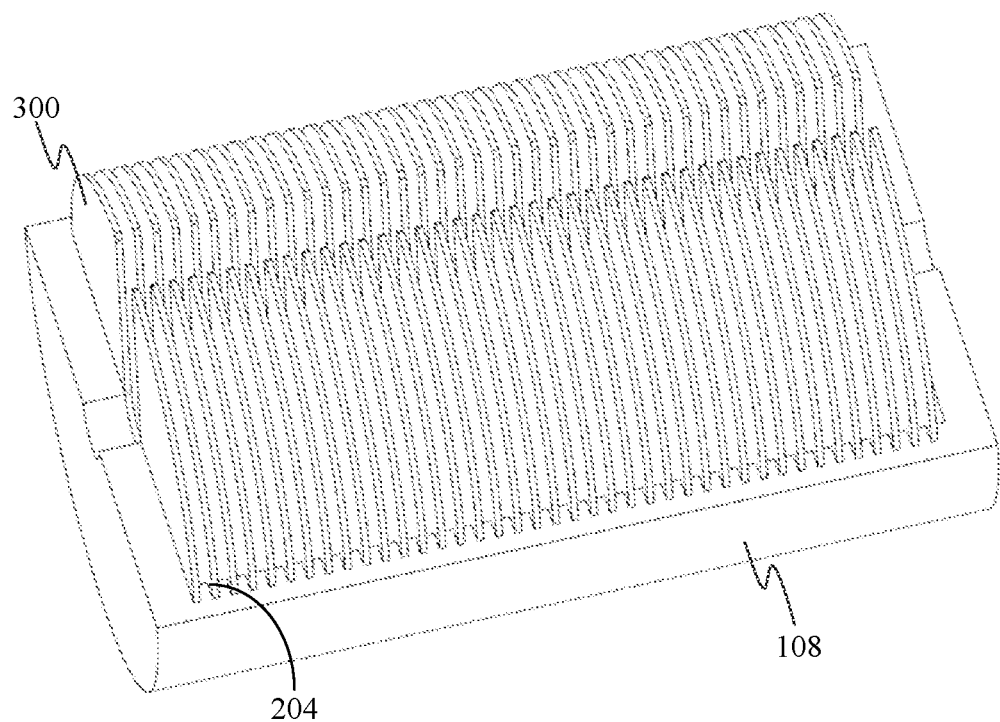
FIG. 4 shows a perspective view of a plurality of housing plates inserted into a plurality of grooves of the housing in accordance with an embodiment.

FIG. 4 shows a perspective view of a plurality of housing plates 300 inserted into plurality of grooves 204 in accordance with an embodiment. As shown in FIG. 4, each housing plate of plurality of housing plates 300 is inserted into a groove of plurality of grooves 204. Each housing plate of the plurality of housing plates 300 is rotationally-coupled to housing 102. Thus, each housing plate 300 rotates when housing 102 rotates, and vice versa. The rotational-coupling may be achieved by the interlocking achieved by aperture 304 receiving rib-like structure 208, as shown in FIGS. 2 and 3 (and optionally by a clamping pressure of the ridges forming each groove on each housing plate 300). In other embodiments, the rotational coupling may be achieved by any suitable means. For example, each housing plate of the plurality of housing plates 300 may have one or more protrusions that mate into one or more slots in housing 102, each housing plate of the plurality of housing plates 300 may have one or more flat sides that abut against one or more flat sides in housing 102 or have an otherwise non-circular shape that engages housing 102, or housing plates 300 may be glued or welded to housing 102. Plurality of housing plates 300 may be coupled to housing 102 in a variety of manners and need not all be coupled to housing 102 in the same manner.

Figure 5:
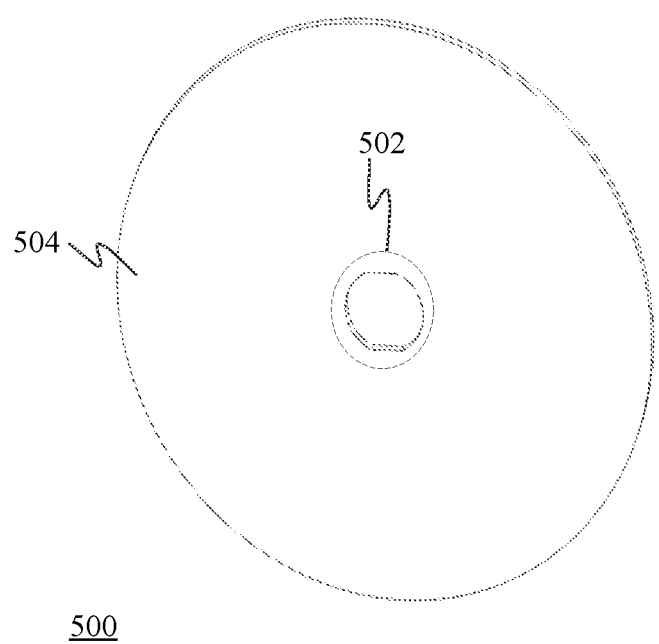
FIG. 5 shows a perspective view of a rotor plate in accordance with an embodiment.

Housing 102 is further configured to house a plurality of rotor plates, where each rotor plate of the plurality of rotor plates is adjacent to a particular housing plate of the plurality of housing plates 300. For example, FIG. 5 shows a perspective view of a rotor plate 500 in accordance with an embodiment. As shown in FIG. 5, rotor plate 500 has a first surface 504 and a second surface (shown in FIG. 12) that opposes first surface 504. Rotor plate 500 is planar and may have a substantially circular shape, although the embodiments described herein are not so limited. Rotor plate 500 may also have a smaller size (e.g., a smaller diameter) than housing plate 300. Rotor plate 500 has a central/axial aperture 502 that is formed to receive shaft 104 such that rotor plate 500 is axially-mounted to shaft 104. Central aperture 502 is shaped to conform to shaft 104 (e.g., being round, hexagonal, or other shape, depending on a profile shape of shaft); in other embodiments, central aperture 502 may take any suitable shape to mount rotor plate 500 to shaft 104. Rotor plate 500 can be made from any suitable electrically-conductive material, such as, a metal (e.g., copper, aluminum, titanium, etc.) or combination of metals/alloy (e.g., steel). Rotor plate 500 may be made from the same material or different material as housing plate 300.

Figure 6:
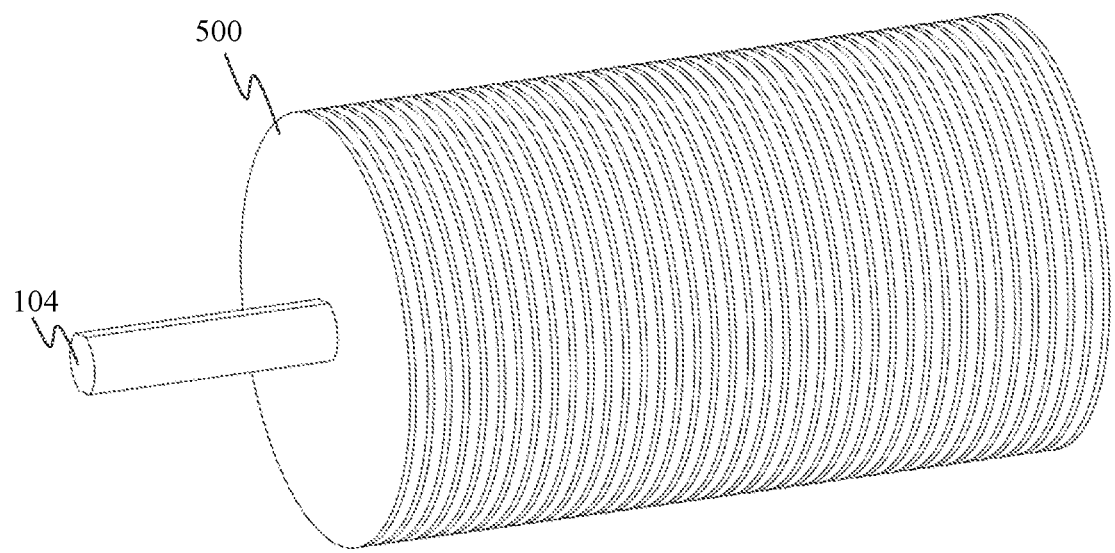
FIG. 6 shows a perspective view of a plurality of rotor plates that are axially-mounted to a shaft in accordance with an example embodiment.
Figure 7:
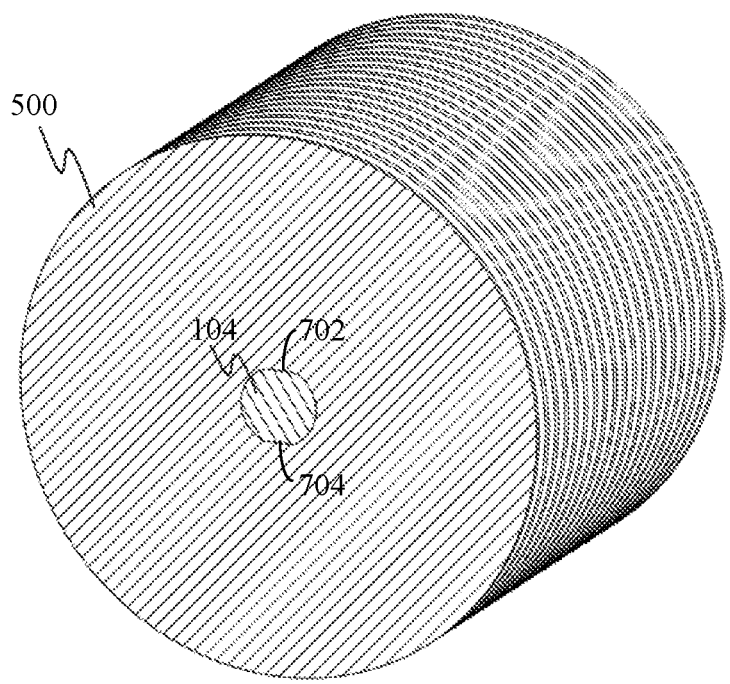
FIG. 7 shows a cross-sectional view of the plurality of rotor plates of FIG. 6 in accordance with an example embodiment.

FIG. 6 shows a perspective view of a plurality of rotor plates 500 that are axially-mounted to shaft 104 in accordance with an example embodiment. FIG. 6 is described with reference to FIG. 7, which shows a cross-sectional view of plurality of rotor plates 500 that are axially-mounted to shaft 104. Plurality of rotor plates 500 may be slid onto shaft 104 via aperture 502. Plurality of rotor plates 500 are rotationally-coupled to shaft 104. Thus, plurality of rotor plates 500 rotate when shaft 104 rotates, and vice versa. The rotational-coupling may be achieved by forming shaft 104 and aperture 502 to have a non-circular shape (e.g., a shape that has at least one flat side, as shown in FIG. 7 (which shows two flat sides 702 and 704), an oval shape, a polygonal shape, etc.). After being slid onto shaft 104, plurality of rotor plates 500 may be positionally-fixed to shaft 104, such that plurality of rotor plates 500 are not moveable laterally along the length of shaft 104. For example, each of plurality of rotor plates 500 may be welded or affixed by an adhesive to a predetermined position of shaft 104. Plurality of rotor plates 500 may also be rotatable relative to housing 102 such that the rotation of plurality of rotor plates 500 does not cause housing plates 300 to rotate. Similarly, plurality of housing plates 300 is rotatable relative to shaft 104 such that rotation of plurality of housing plates 300 does not cause plurality of rotor plates 500 to rotate.

Figure 9:
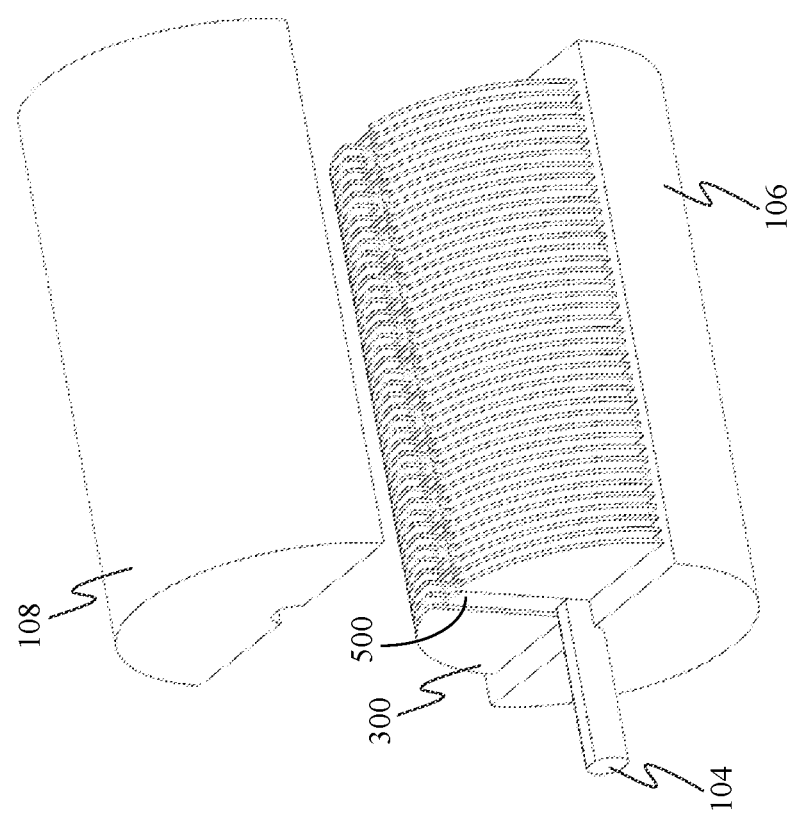
FIG. 9 shows a perspective exploded view of the electrostatic rotary clutch in which the plurality of rotor plates and the shaft are placed into the bottom portion in accordance with an embodiment.
Figure 8:
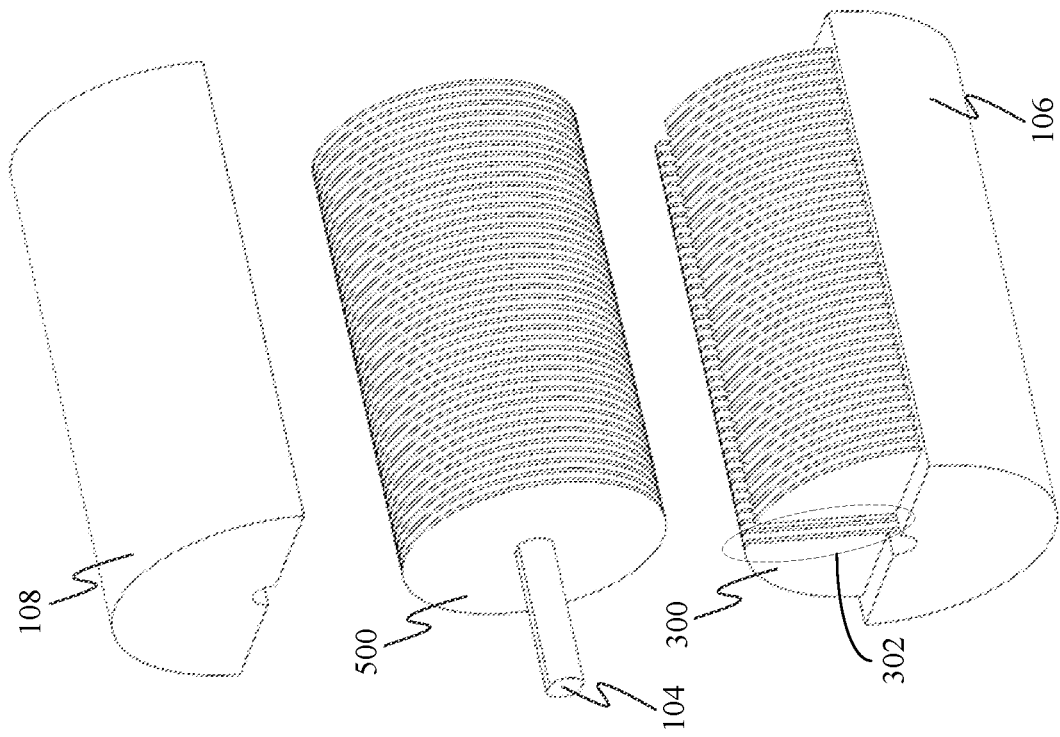
FIG. 8 shows a perspective exploded view of the electrostatic rotary clutch in accordance with an embodiment.

Referring now to FIG. 8, FIG. 8 shows a perspective exploded view of electrostatic rotary clutch 100 in accordance with an embodiment. As shown in FIG. 8, plurality of housing plates 300 are inserted into plurality of grooves 204 of bottom portion 106. Plurality of rotor plates 500 may be inserted into bottom portion 106 by lowering/sliding shaft 104 down into bottom portion 106 via aperture 302 of plurality of housing plates 300 such that each rotor plate of the plurality of rotor plates 500 is placed adjacent to a particular housing plate of plurality of housing plates 300. For example, FIG. 9 shows a perspective view of electrostatic rotary clutch 100 in which plurality of rotor plates 500 and shaft 104 are placed into bottom portion 106 in accordance with an embodiment. As shown in FIG. 9, each rotor plate 500 is positioned adjacent to a particular housing plate 300 in a substantially parallel fashion. After plurality of rotor plates 500 and shaft 104 are placed into bottom portion 106, top portion 108 may be coupled to bottom portion 106 (as shown in FIG. 1), such that plurality of housing plates 300 and plurality of rotor plates 500 are enclosed by housing 102 and shaft 104 is partially enclosed by housing 102. Top portion 108 may be coupled to bottom portion 106 via an adhesive material, an interlocking mechanism (e.g., snaps, screws, magnets, a hook and loop, or other fasteners), etc. Alternatively, housing 102 may be formed as a single piece, for example, as a single hollow tube or where top portion 108 and bottom portion 106 are attached by a hinge, thereby forming a clamshell container.

Figure 10:
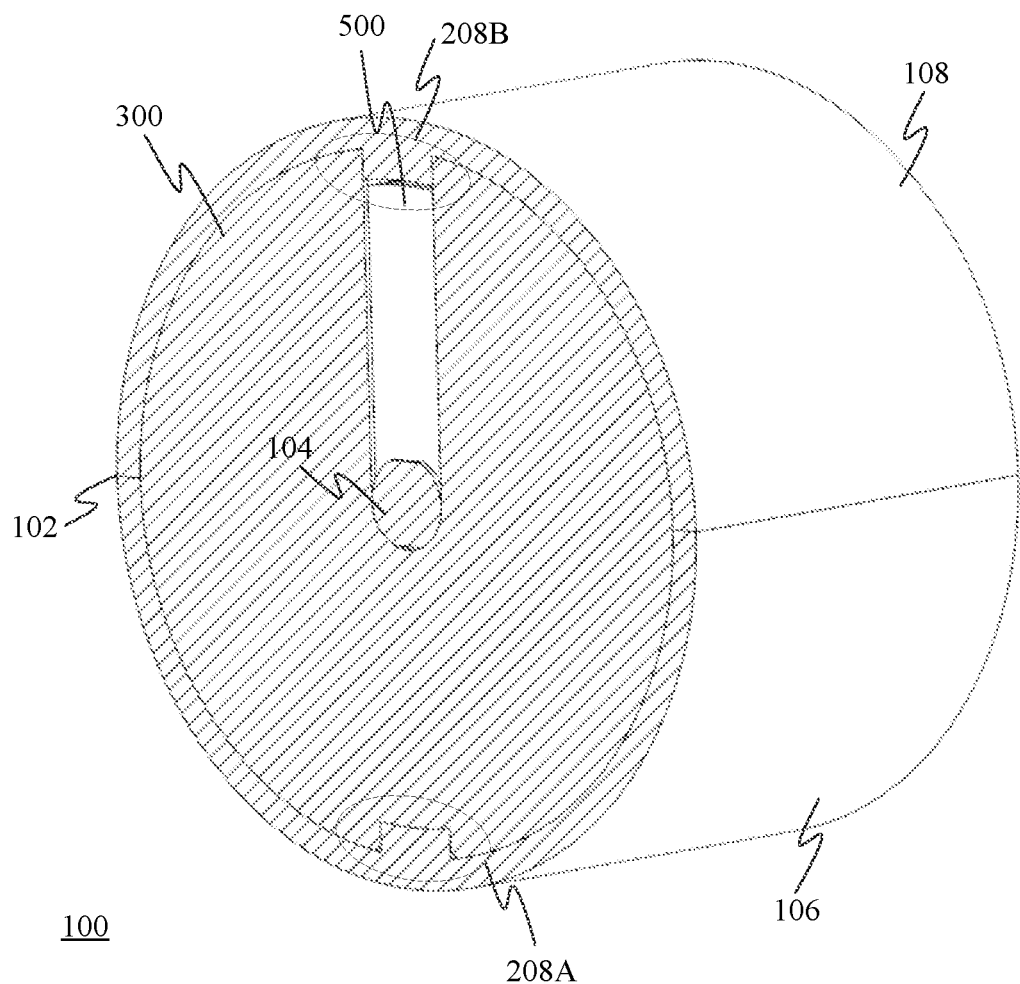
FIG. 10 shows a cross-sectional view of the electrostatic rotary clutch in accordance with an embodiment.

In an embodiment, more than one rib-like structure may be present to enable greater rotational coupling between housing 102 and housing plates 300. For instance, FIG. 10 shows a cross-sectional view of electrostatic rotary clutch 100 in accordance with an embodiment. As shown in FIG. 10, plurality of housing plates 300 is rotationally-coupled to housing 102 via rib-like structure 208A of bottom portion 106 and rib-like structure 208B of top portion 108. As also shown in FIG. 10, plurality of rotor plates 500 are not engaged with housing 102 as a result of the smaller diameter of plurality of rotor plates 500, thereby enabling plurality of rotor plates 500 to rotate relative to housing 102.

Figure 11:
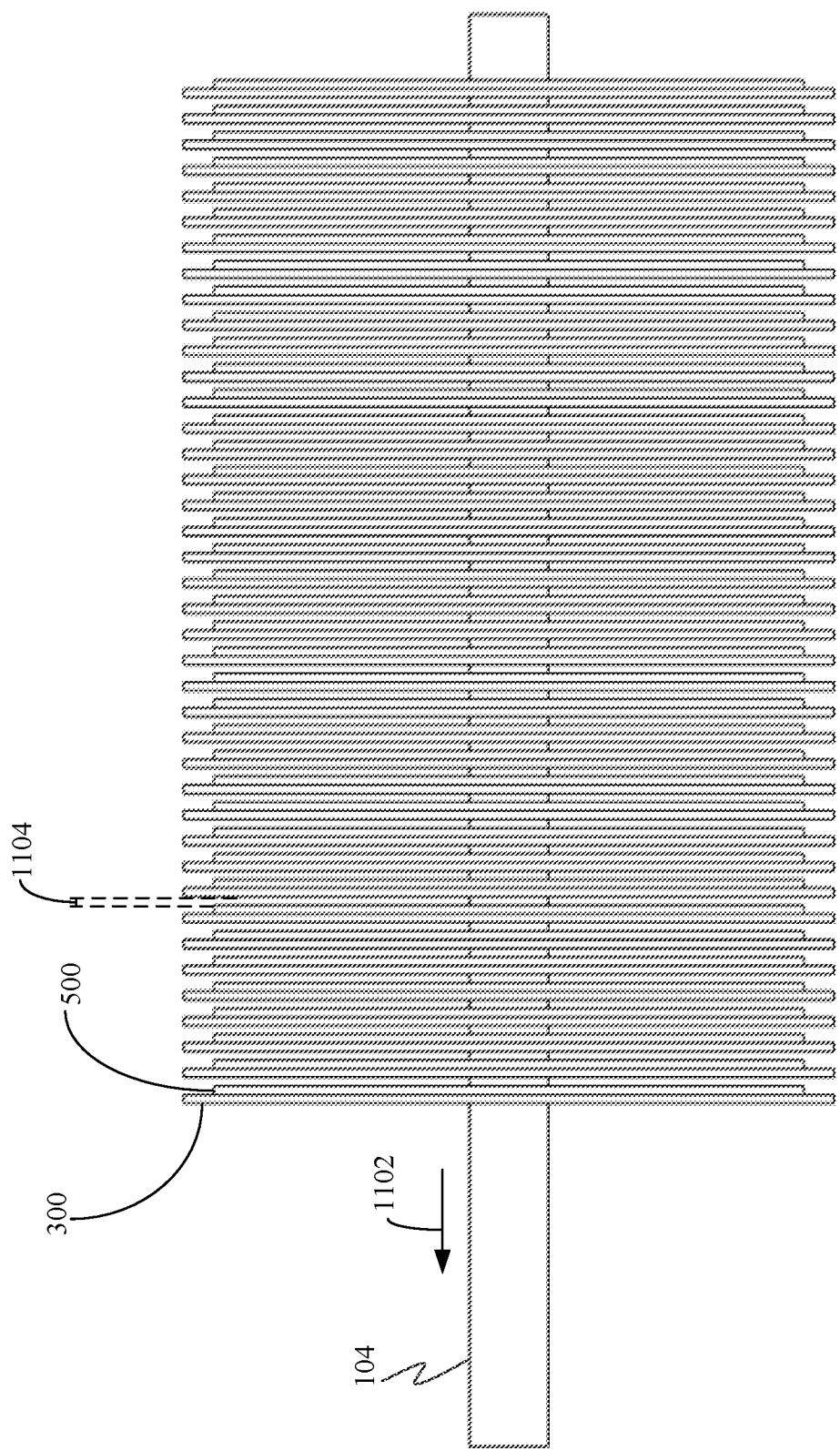
FIG. 11 shows a side view of the electrostatic rotary clutch in accordance with an example embodiment.

FIG. 11 shows a side view of electrostatic rotary clutch 100 in accordance with an example embodiment. Housing 102 is not shown for ease of illustration. As shown in FIG. 11, each rotor plate 500 is positioned adjacent to a corresponding housing plate 300, thereby forming an electrically-conductive plate pair. As shown in FIG. 11, each electrically-conductive plate pair is separated from a next pair by a space 1104, which is defined by the distance between each groove of plurality of grooves 204, as shown in FIG. 2. It is noted that while FIG. 11 shows that electrostatic rotary clutch 100) includes 40 electrically-conductive plate pairs, electrostatic rotary clutch 100 may be adapted to include any number of electrically-conductive plate pairs. In some embodiments, within each plate pair each housing plate of a plurality of housing plates 300 and each rotor plate of a plurality of rotor plates 500 may be biased together. For example, each rotor plate of a plurality of rotor plates 500 may be biased in a direction 1102 towards the corresponding housing plate of a plurality of housing plates 300. Rotor plates 500 may be individually biased in direction 1102, or if rotor plates 500 are rigidly mounted to shaft 104 rotor plates 500 may be collectively biased in direction 1102. For example, shaft 104 or individual rotor plates of plurality of rotor plates 500 may be biased in direction 1102 by a piece of foam, a piece of rubber, a spring, etc. If housing plates 300 and rotor plates 500 are biased together, biasing may be as low force as possible to minimize frictional torques between housing plates 300 and rotor plates 500 when electrostatic rotary clutch 100 is an inactive state.

During operation, a rotary mechanism coupled to shaft 104 may cause shaft 104 (and therefore rotor plates 500) to rotate. Depending on the application, it may be required that the rotation of shaft 104 be reduced or halted when a certain event occurs. To reduce or halt the rotation, a voltage differential (e.g., 1 kilovolt) may be applied between housing plate 300 and rotor plate 500 of each electrically-conductive plate pair, which causes an electrostatic adhesion between each housing plate 300 and rotor plate 500 for each electrically-conductive plate pair. The electrostatic adhesion causes rotor plates 500 to be pulled in direction 1102, thereby causing a frictional force between housing plate 300 and rotor plate 500 of each pair that is proportional to the electrostatic force between each housing plate 300 and rotor plate 500 (which in turn is proportional to the voltage differential). The frictional force causes a torque resistance for shaft 104. The amount of torque resistance (or the amount of torque required to move shaft 104) depends on the voltage differential applied between each housing plate 300 and rotor plate 500. If no voltage differential is applied, then housing plates 300 and rotor plates 500 are free to rotate between each other (i.e., there is no torque resistance). An increase in the voltage differential increases the torque resistance.

To apply the voltage differential, a first voltage may be applied to each housing plate 300 and a second voltage that is different than the first voltage may be applied to each rotor plate 500. The first voltage may be applied via a conductive metal (e.g., a wire, a trace, or other conductor not shown) coupled to housing plates 300. For example, referring to FIG. 10, rib-like structure 208A and/or rib-like structure 208B may comprise a conductive metal at a surface that engages housing plates 300. In another example, grooves 204 (as shown in FIG. 2) may comprise a conductive metal at a surface engaging housing plates 300. The second voltage may be provided to rotor plates 500 directly. For example, the second voltage may be applied to the edge of each rotor plate of a plurality or rotor plates 500 via a spring contact (not shown). Alternately, the second voltage may be applied to the edge of at least one rotor plate of a plurality or rotor plates 500 via a spring contact and applied to the remaining rotor plates of a plurality of rotor plates 500 through shaft 104. Alternatively, the second voltage may be provided to rotor plates 500 via shaft 104. For example, the second voltage may be applied to shaft 104, and the second voltage is applied to rotor plates 500 via shaft 104. The second voltage may be applied to shaft 104 via a motor brush (not shown), which can be inside or outside of housing 102. Shaft 104 may be comprised of one or more materials at least one of which may be conductive to apply the second voltage to rotor plates 500. Shaft 104 may be coated in an insulative material, for example between rotor plates 500, to prevent electrical conduction or arcing to housing plates 300. To maintain electrical isolation between housing plates 300 and rotor plates 500, rounded end portion 306 of aperture 302 of housing plates 300 (as shown in FIG. 3) may be coated with an insulative material. The first and second voltages may be applied by a voltage controller (not shown) that is configured to detect that one or more certain events have occurred and that applies the first and second voltages responsive to detecting the event(s).

To disengage housing plates 300 from rotor plates 500, the same voltage may be applied to both housing plates 300 and rotor plates 500 (to remove the voltage differential), thus enabling housing plates 300 and rotor plates 500 to rotate freely.

Figure 12:
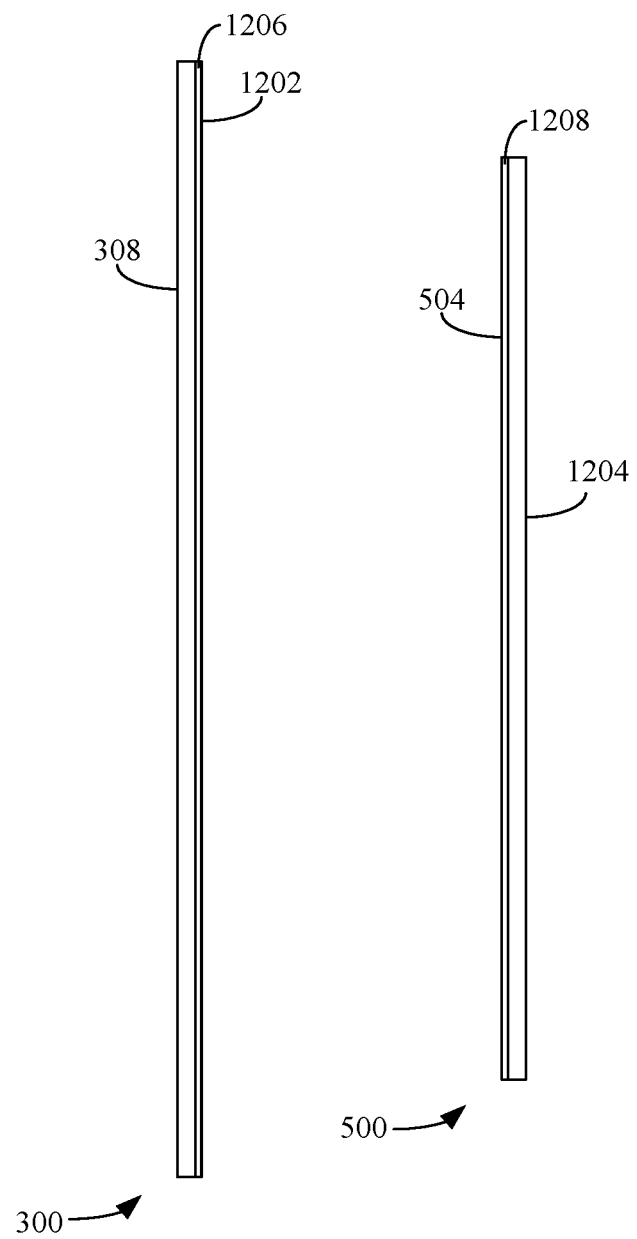
FIG. 12 shows a side view of a housing plate and a rotor plate in accordance with an embodiment.

To prevent electricity from conducting or arcing between housing plate 300 and rotor plate 500 in each electrically-conductive pair, housing plate 300 and/or rotor plate 500 may be covered in a dielectric. FIG. 12 shows a side view of housing plate 300 and rotor plate 500 in accordance with an embodiment. Housing plate 300 comprises first surface 308 and a second surface 1202 that is opposite to first surface 308, and rotor plate 500 comprises first surface 504 and a second surface 1204 that is opposite to surface 504. Second surface 1202 faces first surface 504 in an electrostatic rotary clutch. Second surface 1202 and/or first surface 504 may comprise a dielectric material (shown as dielectric material 1206 and dielectric material 1208). Furthermore, an insulator may be applied to the first surface 308 of housing plate 300 and/or second surface 1204 of rotor plate 500 to prevent electricity from conducting or arcing between housing plates and rotor plates of adjacent plate pairs. In general, plurality of house plates 300 and plurality of rotor plates 500 are not limited to the aforementioned layers but may be comprised of additional conductive, insulative (specifically dielectric), or semi-conductive layers.

In an embodiment, a maximum torque of electrostatic rotary clutch 100 may be proportional to the dielectric constant of dielectric material 1206 and dielectric material 1208. Thus, the higher the dielectric constant, the higher the torque. The breakdown voltage of dielectric material 1206 and dielectric material 1208 and the thickness thereof are generally related, but the highest ratio of breakdown voltage to thickness would achieve the maximum torque since the maximum torque of electrostatic rotary clutch 100 is proportional to the square of the maximum voltage and inversely proportional to the square of the distance between the housing plate 300 and rotor plate 500. The coefficient of friction between dielectric material 1206 and dielectric material 1208 (in an embodiment in which both housing plate 300 and rotor plate 500 comprise a dielectric material), between dielectric material 1206 and rotor plate 500 (in an embodiment in which only housing plate 300 comprises a dielectric material), or between dielectric material 1208 and housing plate 300 (in an embodiment in which only rotor plate 500 comprises a dielectric material) may be as high as possible since the maximum torque of electrostatic rotary clutch 100 is proportional to this coefficient of friction. Furthermore, the material wear between dielectric material 1206 and dielectric material 1208 (in an embodiment in which both housing plate 300 and rotor plate 500 comprise a dielectric material), between dielectric material 1206 and rotor plate 500 (in an embodiment in which only housing plate 300 comprises a dielectric material), or between dielectric material 1208 and housing plate 300 (in an embodiment in which only rotor plate 500 comprises a dielectric material) should be as low as possible to allow the longest life out of electrostatic rotary clutch 100 before dielectric material 1206 and/or dielectric material 1208 wears through and electrostatic rotary clutch 100 ceases to function. Other materials/coatings/lubricants may be applied to one or both of housing plates 300 and rotor plates 500 at second surface 1202 and first surface 504 to reduce wear or improve grip. Specific, nonlimiting examples of suitable dielectrics include thin polyimide films such as DuPont's Kapton film and a barium titanate-filled ceramic polymer composite such as DuPont's LuxPrint. Dielectric material 1206 and/or dielectric material 1208 may be coated on, adhered to, or otherwise deposited on housing plates 300 and/or rotor plates 500 in any suitable manner.

If housing 102 of electrostatic rotary clutch 100 is rigidly mounted to the body of a device, electrostatic rotary clutch 100 acts as a brake, wherein shaft 104 resists rotation relative to the body of the device. However, an output axle (or gear teeth, belt, or other torque transmission mechanism) may be integrally formed into, attached to, or coupled to housing 102 such that electrostatic rotary clutch 100 acts as clutch that controls the maximum torque transmitted between shaft 104 and the output axle.

The torque achieved by electrostatic rotary clutch 100 may be governed in accordance with the force between each housing plate 300 and rotor plate 500 and the pressure at a given point on housing plate 300 and rotor plate 500. The approximate force between each housing plate 300 and rotor plate 500 may be determined in accordance with Equation 1, which is shown below:

$$F = \frac{\varepsilon_r \cdot \varepsilon_0 \cdot A \cdot \Delta V^2}{2d^2} \quad \text{(Equation 1)}$$

where F is the force between the each housing plate 300 and rotor plate 500, $\varepsilon_r$ is the dielectric constant of dielectric material 1206 and/or dielectric material 1210. $\varepsilon_0$ is the permittivity of free space $$\left(\text{e.g., } 8.85 \cdot 10^{-12} \; \frac{\text{Farads}}{\text{meter}}\right),$$

A is the overlapping area of each of housing plate 300 and rotor plate 500, $\Delta V$ is the voltage differential across each of housing plate 300 and rotor plate 500, and d is the distance between each of housing plate 300 and rotor plate 500. In an embodiment in which both housing plate 300 and rotor plate 500 comprise a dielectric material, d corresponds to the combined thickness of dielectric material 1206 and dielectric material 1208 when housing plate 300 and rotor plate 500 are engaged. In an embodiment in which only housing plate 300 comprises a dielectric material, d corresponds to the thickness of dielectric material 1202 when housing plate 300 and rotor plate 500 are engaged. In an embodiment in which only rotor plate 500 comprises a dielectric material, d corresponds to the thickness of dielectric material 1208 when housing plate 300 and rotor plate 500 are engaged.

The pressure at a given point on housing plate 300 and rotor plate 500 may be determined in accordance with Equation 2, which is shown below:

$$P = \frac{F}{A} = \frac{\varepsilon_r \cdot \varepsilon_0 \cdot \Delta V^2}{2d^2} \quad \text{(Equation 2)}$$

where P is the pressure at a given point on housing plate 300 and rotor plate 500.

The torque between a single electrically-conductive plate pair may be determined in accordance with Equation 3, which is shown below:

$$\tau = \int_0^R \mu \cdot (P \cdot 2\pi r) \cdot r \, dr = \quad \text{(Equation 3)}$$

$$\frac{2\pi \cdot \mu \cdot P \cdot R^3}{3} = \frac{\pi \cdot \mu \cdot \varepsilon_r \cdot \varepsilon_0 \cdot \Delta V^2 \cdot R^3}{3d^2}$$

where R is the radius of rotor plate 500 and $\mu$ is the coefficient of friction between housing plate 300 and rotor plate 500. For N electrically-conductive plate interfaces (one per housing/rotor plate pair), the torque may be determined in accordance with Equation 4, which is shown below:

$$\tau_N = \frac{N \cdot \pi \cdot \mu \cdot \varepsilon_r \cdot \varepsilon_0 \cdot \Delta V^2 \cdot R^3}{3d^2} \quad \text{(Equation 4)}$$

where all housing plates 300 are substantially identical and all rotor plates 500 are substantially identical. If a subset of housing plates 300 and/or rotor plates 500 have different radii, thicknesses of dielectric material 1202 or 1208, dielectric constants of dielectric material 1202 or 1208, etc., the torque is the sum of the torques of the individual plate pairs.

In an example in which there are 20 electrically-conductive plate pairs, the coefficient of friction between housing plate 300 and rotor plate 500 is 0.3, the dielectric constant of dielectric material 1206 and/or dielectric material 1208 is 10, the voltage differential is 300 volts, the radius of rotor plates 500 is 10 millimeters, and the distance of between the each housing plate 300 and each rotor plate 500 is 20 micrometers, the maximum torque achieved by electrostatic rotary clutch 100 is 0.126 Newton-meters.

B. An Electrostatic Rotary Clutch Comprising Moveable Housing Plates and Rotor Plates In accordance with an embodiment, both housing plates and rotor plates may be moveable laterally along the length of the shaft. In accordance with such an embodiment, the housing plates are not fixed into place via grooves (e.g., grooves 204, as shown in FIG. 2), and rotor plates are not positionally-fixed onto the shaft. In accordance with such an embodiment, the housing can include an increased number of housing plates and rotor plates and electrostatic interfaces on both sides of each plate rather than just one, thereby increasing the maximum torque output that can be achieved by the electrostatic rotary clutch. Such an embodiment is described below with reference to FIGS. 13A-20.

Figure 13A:
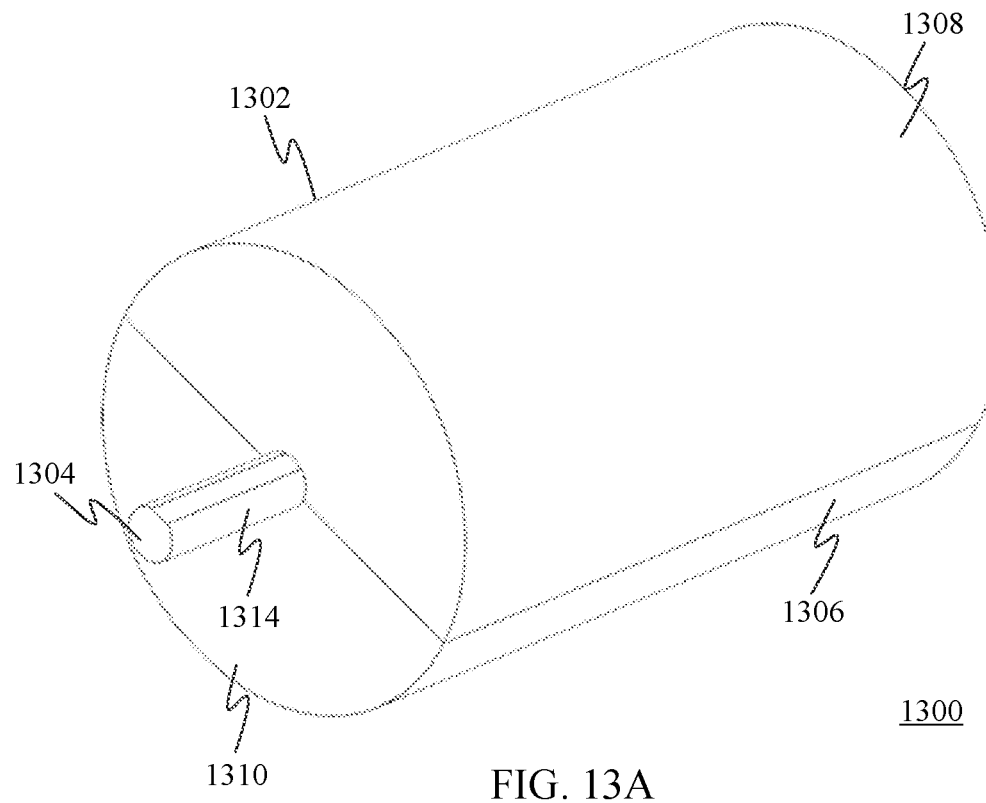
FIGS. 13A and 13B show perspective front and back views of an example electrostatic rotary clutch in accordance with another embodiment.
Figure 13B:
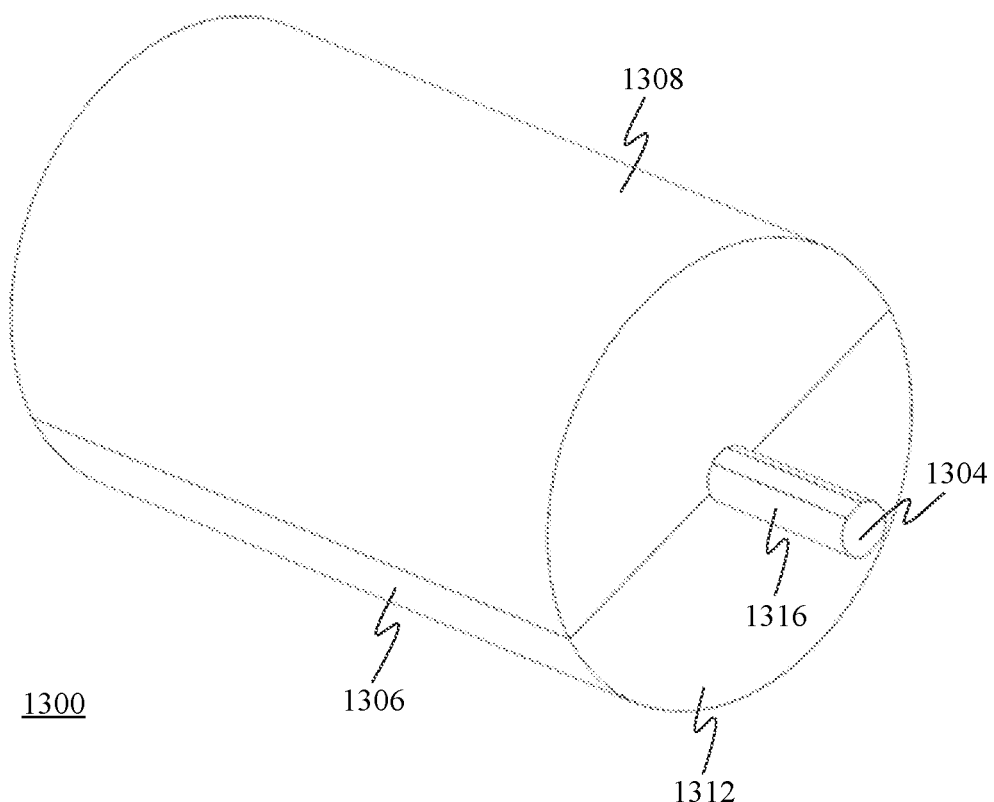

FIGS. 13A and 13B show perspective front and back views of an example electrostatic rotary clutch 1300 in accordance with an embodiment. As shown in FIGS. 13A and 13B, electrostatic rotary clutch 1300 includes a housing 1302 and a shaft 1304. Housing 1302 may comprise a bottom portion 1306 and a top portion 1308. Housing 1302 partially houses shaft 1304 such that a first exposed portion 1314 of shaft 1304 protrudes from a first side 1310 of housing 1302 and a second exposed portion 1316 of shaft 1304 protrudes from a second side 1312 of housing 1302. Housing 1302 may be manufactured from any suitable material(s). For example, housing 1302 may be comprised at least in part of material(s) that act as an insulator, such as plastic (e.g., injection molded), rubber. Shaft 1304 is configured to be coupled to rotary mechanism (not shown), such as, but not limited to, a gear, a pulley, an axle, etc.

It is noted that while FIGS. 13A and 13B show shaft 1304 protruding from housing 1302 from first side 1310 and second side 1312, in certain embodiments, shaft 1304 may only protrude from one of first side 1310 or second side 1312. In some embodiments, a gear or other torque transmission mechanism may be coupled to shaft 1304 internal to housing 1302 and shaft 1304 may not protrude from housing 1302. It is further noted that while housing 1302 is shown as having a cylindrical shape, housing 1302 may be any shape.

It is further noted that housing 1302 is similar to housing 102 of FIGS. 1A and 1B and may be similar in size as housing 102 (as shown in FIG. 1). However, as described below, the interior of housing 1302 differs from that of housing 102.

Figure 14:
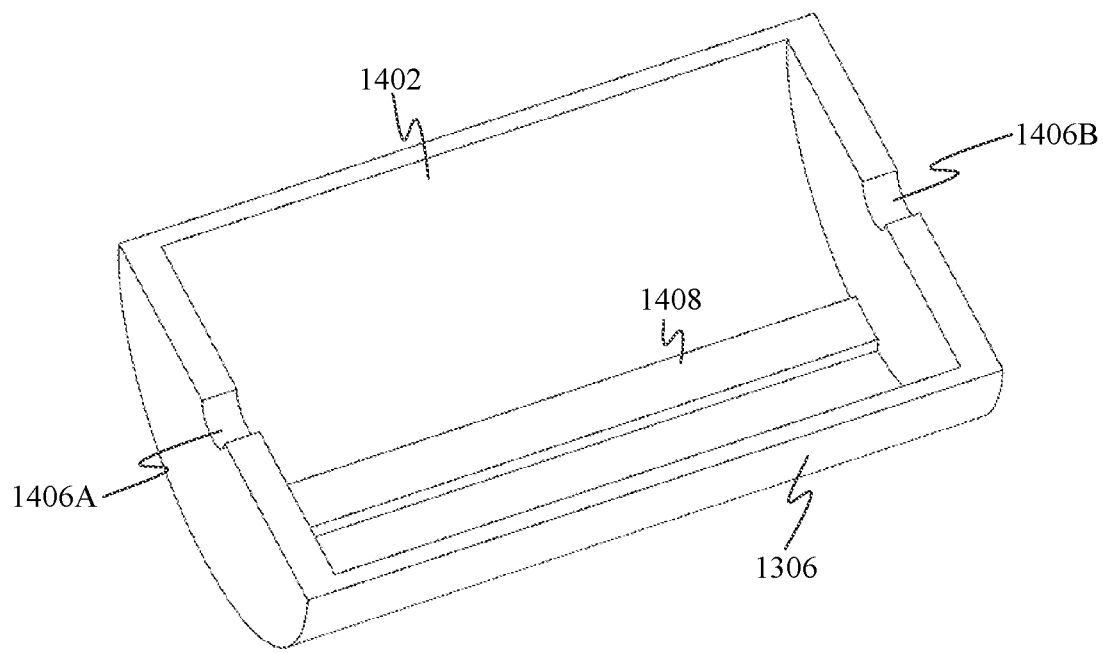
FIG. 14 shows a perspective view of an interior of a bottom portion of a housing of the electrostatic rotary clutch in accordance with an embodiment.

For example, FIG. 14 shows a perspective view of an interior of bottom portion 1306. Bottom portion 1306 and top portion 1308 may be identical in size, structure and/or features. Thus, bottom portion 1306 of FIG. 14 may also be representative of top portion 1308. As shown in FIG. 14, bottom portion 1306 comprises an interior surface 1402 that includes a rib-like structure 1408 (similar to rib-like structure 208 of FIG. 2) that protrudes from interior surface 1402. Rib-like structure 1408 is configured to receive a housing plate (described below with reference to FIG. 15). Bottom portion 1306 also has an aperture 1406A and an aperture 1406B, which are formed to receive shaft 1304. Housing 1302 is configured to house a plurality of housing plates and a plurality of rotor plates.

Figure 15:
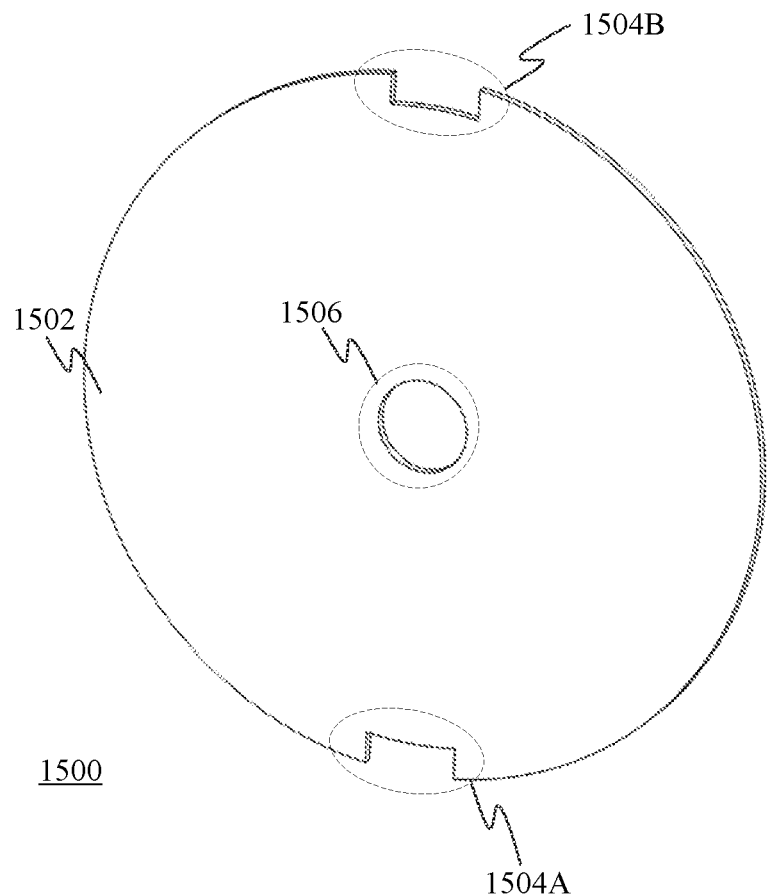
FIG. 15 shows a perspective view of a housing plate in accordance with another example embodiment.

FIG. 15 shows a perspective view of a housing plate 1500 in accordance with an example embodiment. As shown in FIG. 15, housing plate 1500 is planar and comprises a first surface 1502 and a second surface (shown in FIG. 20) that opposes first surface 1502. Housing plate 1500 may have a substantially circular shape, but the embodiments described herein are not so limited. As also shown in FIG. 15, housing plate 1500 has a first aperture 1504A, a second aperture 1504B, and a third (central/axial) aperture 1506. First aperture 1504A is formed in a peripheral edge of housing plate 1500 to receive rib-like structure 1408 of bottom portion 1306 and second aperture 1504B is formed in the peripheral edge of housing plate 1500 (opposite to aperture 1504A) to receive a similarly-configured rib-like structure of top portion 1308. Third aperture 1506 is centrally-located within housing plate 1500 and is formed to receive shaft 1304 such that housing plate 1500 is axially-mounted to shaft 104. Housing plate 1500 can be made from any suitable electrically-conductive material, such as, a metal (e.g., copper, aluminum, titanium, etc.) or combination of metals/alloy (e.g., steel).

Housing 1302 is further configured to house a plurality of rotor plates, such as rotor plate 500 shown in FIG. 5. Each rotor plate 500 of the plurality of rotor plates is adjacent to a corresponding housing plate 1500 of the plurality of housing plates. Rotor plate 500 may have a substantially circular shape, although the embodiments described herein are not so limited. Rotor plate 500 may also have a smaller size (e.g., a smaller diameter) than housing plate 1500. Aperture 502 is formed to receive shaft 1304 such that rotor plate 500 is axially-mounted to shaft 1304. Rotor plate 500 may be made from the same material or different material as housing plate 1500.

Figure 16:
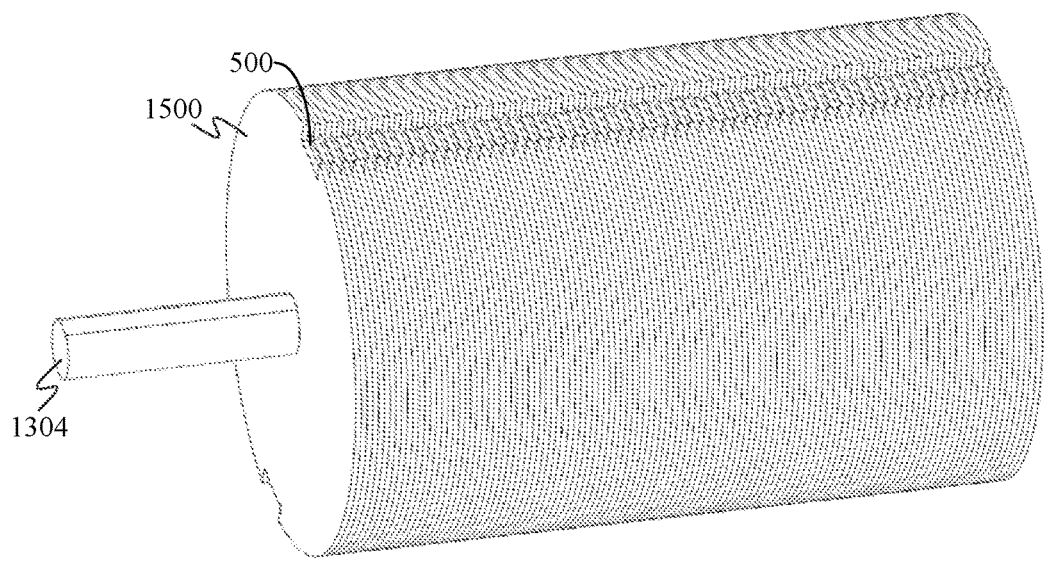
FIG. 16 shows a perspective view of a plurality of housing plates and a plurality of rotor plates that are axially-mounted to a shaft in accordance with an example embodiment.

FIG. 16 shows a perspective view of a plurality of housing plates 1500 and a plurality of rotor plates 500 that are axially-mounted to shaft 1304 in accordance with an example embodiment. Plurality of housing plates 1500 and plurality of rotor plates 500 may be slid onto shaft 1304 via aperture 1506 of housing plates 1500 and aperture 502 of rotor plates 500. As shown in FIG. 16, each rotor plate 500 is positioned adjacent to a corresponding housing plate 1500 in a substantially parallel fashion. Plurality of rotor plates 500 are rotationally-coupled to shaft 1304 in a similar manner as described above with reference to FIG. 7. Both plurality of housing plates 1500 and plurality of rotor 1500 are configured to be moveable laterally along the length of shaft 1304. Plurality of rotor plates 500 may also be rotatable relative to housing 1302 such that the rotation of plurality of rotor plates 500 does not cause housing plates 1500 to rotate. Similarly, plurality of housing plates 1500 is rotatable relative to shaft 1304 such that rotation of plurality of housing plates 1500 does not cause plurality of rotor plates 500 to rotate.

Figure 17:
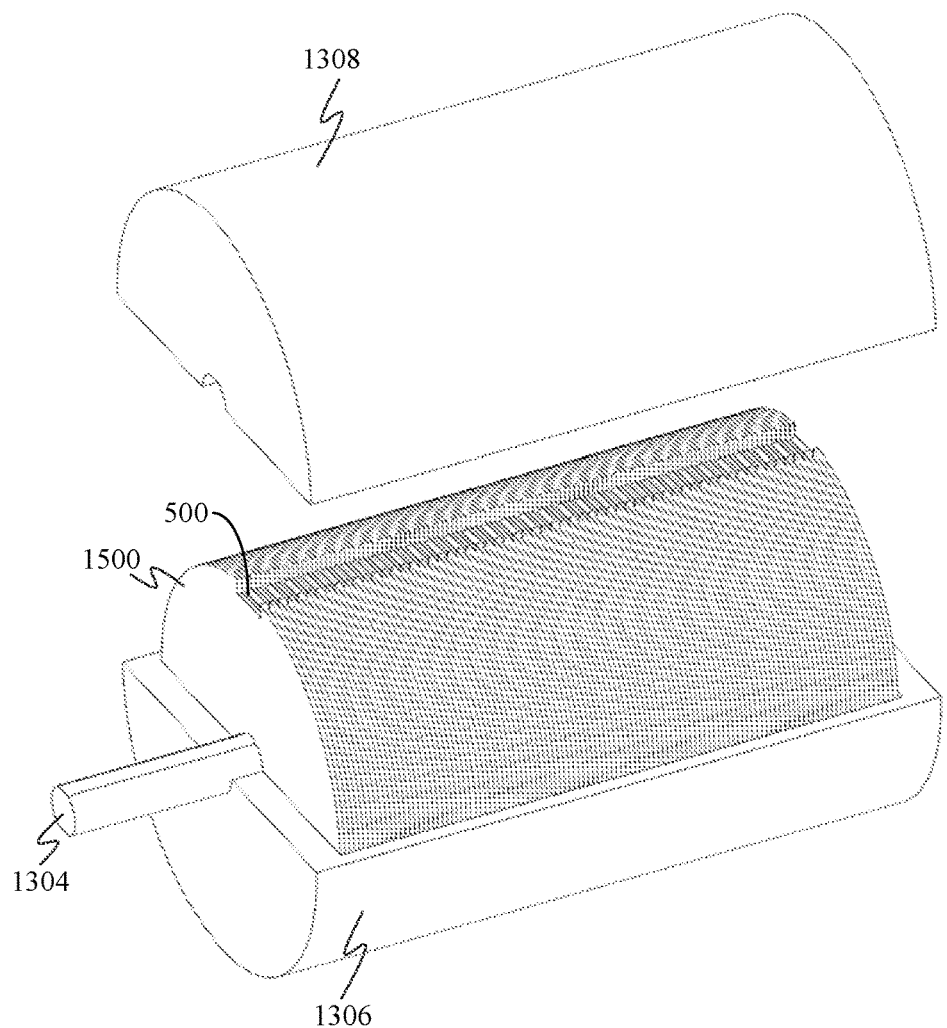
FIG. 17 shows a perspective view of the electrostatic rotary clutch in which the plurality of housing plates, the plurality of rotor plates and the shaft are placed into the bottom portion in accordance with an embodiment.

Referring now to FIG. 17, FIG. 17 shows a perspective view of electrostatic rotary clutch 1300 in which plurality of housing plates 1500, plurality of rotor plates 500 and shaft 1304 are placed into bottom portion 1306 in accordance with an embodiment. After plurality of housing plates 1500, plurality of rotor plates 500 and shaft 104 are placed into bottom portion 1306, top portion 1308 may be coupled to bottom portion 1306 (as shown in FIG. 13), such that plurality of housing plates 1500 and plurality of rotor plates 500 are enclosed by housing 102 and shaft 1304 is partially enclosed by housing 1302. Top portion 1308 may be coupled to bottom portion 1306 via an adhesive material, an interlocking mechanism (e.g., snaps, screws, magnets, a hook and loop, or other fasteners), etc. Alternatively, housing 1302 may be formed as a single piece, for example, as a single hollow tube or where top portion 1308 and bottom portion 1306 are hingedly attached, thereby forming a clamshell container.

Figure 18:
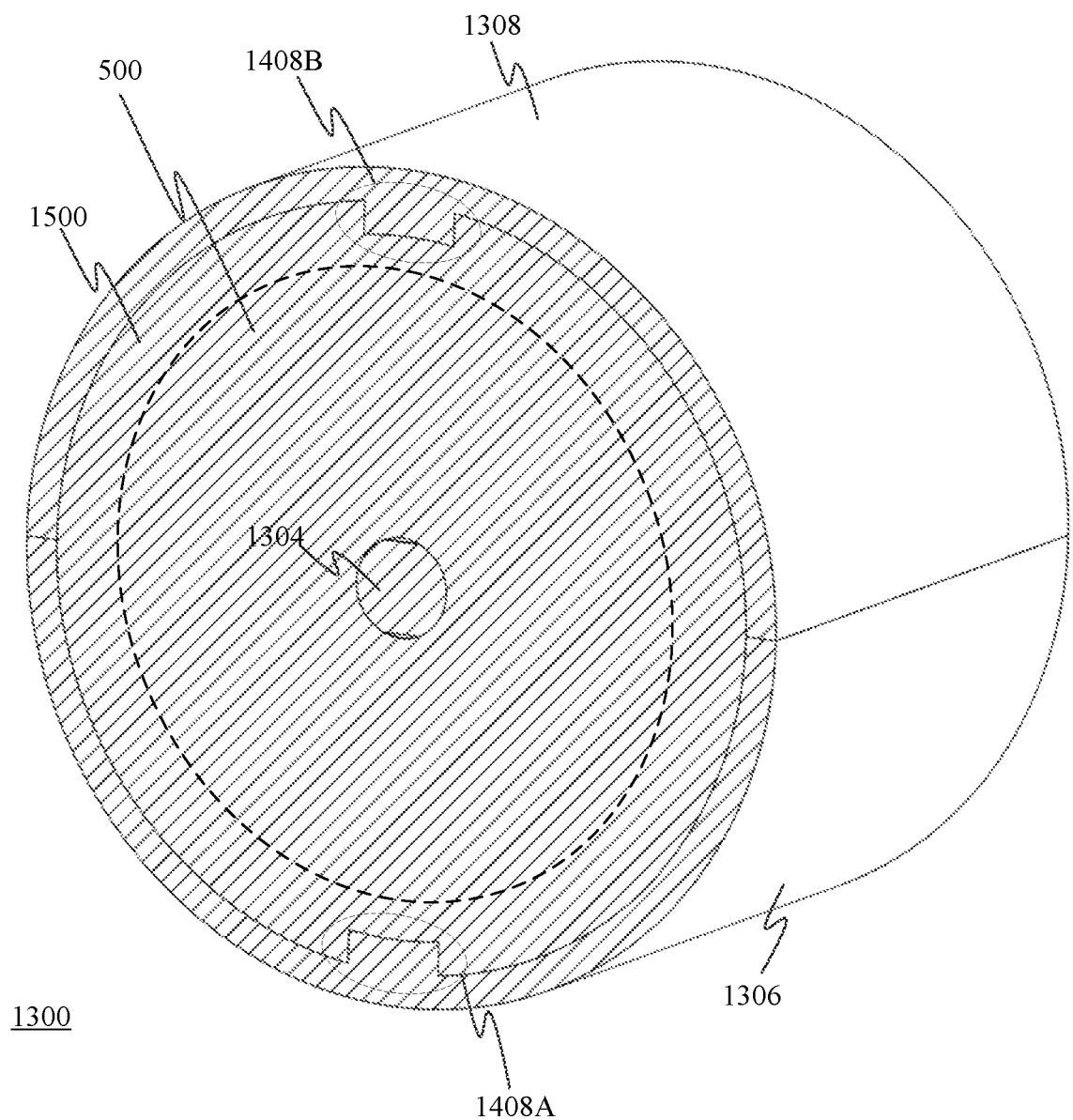
FIG. 18 shows a cross-sectional view of the electrostatic rotary clutch in accordance with another embodiment.

FIG. 18 shows a cross-sectional view of electrostatic rotary clutch 1300 in accordance with an embodiment. As shown in FIG. 18, plurality of housing plates 1500 is rotationally-coupled to housing 1302 via rib-like structure 1408A of bottom portion 1306 and rib-like structure 1408B of top portion 1308. In other embodiments, the rotational coupling may be achieved by any suitable means. For example, each housing plate of the plurality of housing plates 1500 may have one or more protrusions that mate into one or more slots in housing 1302 or each housing plate of the plurality of housing plates 1500 may have one or more flat sides that abut against one or more flat sides in housing 1302 or have an otherwise non-circular shape that engages housing 1302. Plurality of housing plates 1500 may be coupled to housing 1302 in a variety of manners and need not all be coupled to housing 102 in the same manner. As also shown in FIG. 18, plurality of rotor plates 500 are not engaged with housing 102 as a result of the smaller diameter of plurality of rotor plates 500, thereby enabling plurality of rotor plates 500 to rotate relative to housing 1302.

Figure 19:
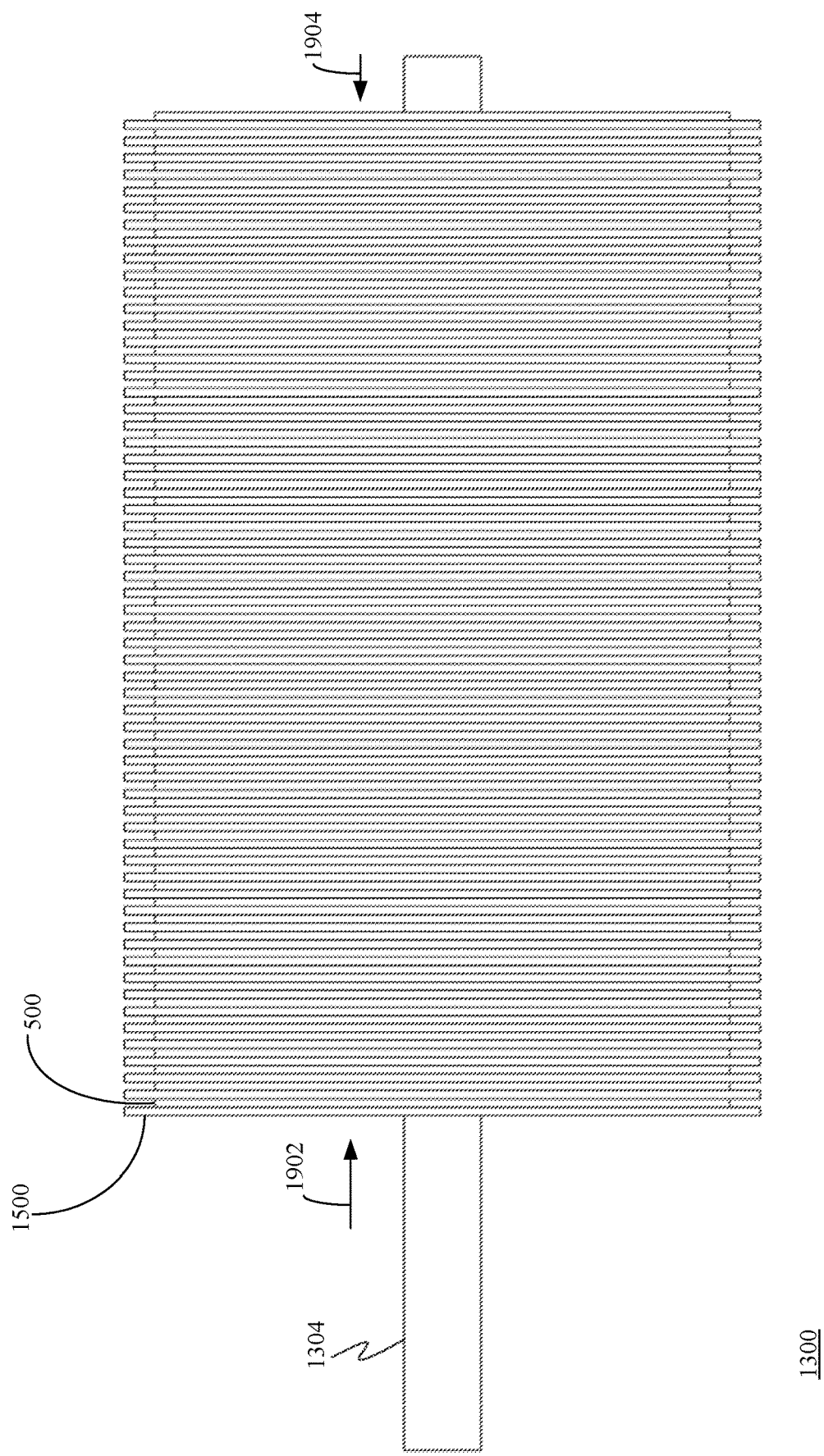
FIG. 19 shows a side view of the electrostatic rotary clutch in accordance with another example embodiment.

FIG. 19 shows a side view of electrostatic rotary clutch 1300 in accordance with an example embodiment. Housing 1302 is not shown for brevity. As shown in FIG. 19, a plurality of housing plates 1500 are interleaved with a plurality of rotor plates 500. As shown in FIG. 19, rotor plates 500 need not be separated from housing plates 1500 by a space (e.g., space 1104) due to housing plates 1500 not being positioned in a plurality of grooves (e.g., grooves 204). This enables more housing plates 1500 and rotor plates 500 to be included in housing 1302 than compared to housing 102, thereby resulting in a higher maximum torque output. For example, as shown in FIG. 19, 60 housing plates 1500 and 60 rotor plates 500 may be included in housing 1302, whereas housing 102 includes 40 housing plates 300 and 40 rotor plates 500. It is noted that while FIG. 19 shows that electrostatic rotary clutch 1300 includes 60 housing plates 1500 and 60 rotor plates 500, electrostatic rotary clutch 1300 may be adapted to include any number of housing plates 1500 and rotor plates 500. Furthermore compared to electrostatic rotary clutch 100, wherein each housing plate interfaces with one rotor plate and each rotor plate interfaces with one housing plate, in electrostatic rotary clutch 1300, each rotor plate interfaces with two housing plates (one on each side—except for possibly the end plates) and each housing plate interfaces with two rotor plates (one on each side—except for possibly the end plates), thereby doubling the number of interfaces and the maximum clutch torque.

Similar to the embodiment described in Subsection A, a voltage differential (e.g., 1 kilovolt) may be applied between each housing plate 300 and rotor plate 500 to reduce or halt the rotation of shaft 1304. The voltage differential causes an electrostatic adhesion between each housing plates 1500 and rotor plates 500, thereby causing the housing plates 1500 and rotor plates 500 to pull together in a first direction 1902 and a second direction 1904 (i.e., housing plates 1500 and rotor 500 pull together similar to an accordion). In accordance with such an embodiment, the electrostatic adhesion is between each surface of housing plate 1500 that is engaged with a surface of particular rotor plate 500 and each surface of rotor plate 500 that is engaged with a surface of a particular housing plate 1500 (i.e., the electrical adhesion may occur on both surfaces of housing plate 1500 and/or rotor plate 500). In some embodiments, plurality of housing plates 1500 and plurality of rotor plates 500 may be biased together so that there are no gaps between plurality of housing plates 1500 and plurality of rotor plates 500. For example, plurality of housing plates 1500 and plurality of rotor plates 500 may be compressed together by a piece of foam, a piece of rubber, a spring, etc. If housing plates 1500 and rotor plates 500 are biased together, biasing may be as low force as possible to minimize frictional torques between housing plates 1500 and rotor plates 500 when electrostatic rotary clutch 1300 is an inactive state.

As described above in Subsection A, to apply the voltage differential, a first voltage may be applied to each housing plate 1500 and a second voltage that is different than the first voltage may be applied to each rotor plate 500. The first voltage may be applied via a conductive metal (not shown) coupled to housing plates 1500. For example, referring to FIG. 18, rib-like structure 1408A and/or rib-like structure 1408B may comprise a conductive metal at a surface that engages housing plates 1500. The second voltage may be applied to shaft 1304, and the second voltage is applied to rotor plates 500 via shaft 1304. The second voltage may be applied to shaft 1304 via a motor brush (not shown), which can be inside or outside of housing 1302. To prevent the second voltage from being applied to each of housing plates 1500, aperture 1506 of housing plates 1500 (as shown in FIG. 15) may be coated with an insulative material.

Figure 20:
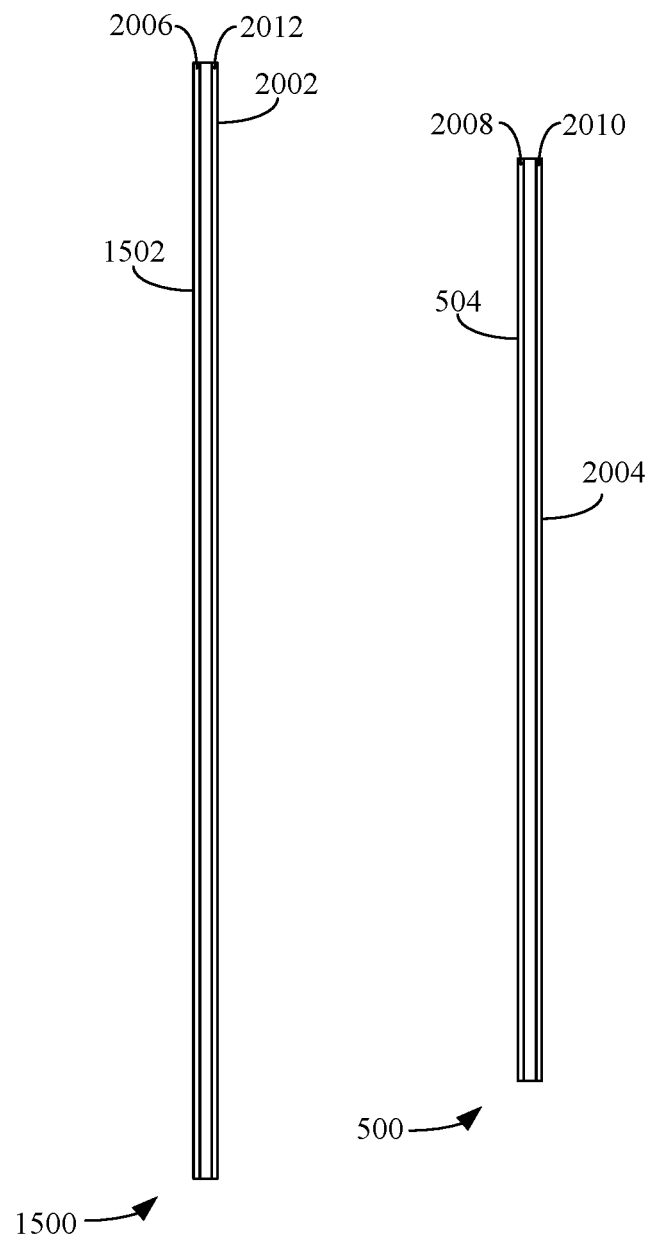
FIG. 20 shows a side view of a housing plate and a rotor plate in accordance with an example embodiment.

To prevent electricity from conducting or arcing between housing plates 1500 and rotor plates 500, housing plates 1500 and/or rotor plate 500 may be covered in a dielectric as described above in a similar manner as described in Subsection A. However, the dielectric material may be applied on each surface of a housing plate 1500 that faces a surface of a rotor plate 500 and/or the dielectric material may be applied on each surface of a rotor plate 500 that faces a surface of housing plate 1500. For example, FIG. 20 shows a side view of housing plate 1500 and rotor plate 500. Housing plate 1500 comprises first surface 1502 and a second surface 2002 that is opposite to first surface 1502, and rotor plate 500 comprises first surface 504 and a second surface 2004 that is opposite to surface 504. Second surface 2002 faces first surface 504 in electrostatic rotary clutch 100. Second surface 2002 and/or first surface 504 may comprise a dielectric material (shown as dielectric material 2012 and dielectric material 2008). If first surface 1502 of housing plate 1500 faces another rotor plate (not shown), first surface 1502 may also comprise a dielectric material 2006. The surface of the other rotor plate that faces first surface 1502 may comprise a dielectric material in addition to or in lieu of dielectric material 2006. If second surface 2004 of rotor plate 500 faces another housing plate (not shown), second surface 2004 may also comprise a dielectric material 2010. The surface of the other housing plate that faces second surface 2004 may comprise a dielectric material in addition to or in lieu of dielectric material 2010. In general, plurality of housing plates 1500 and plurality of rotor plates 500 are not limited to the aforementioned layers but may be comprised of additional conductive, insulative (specifically dielectric), or semi-conductive layers.

The torque achieved by electrostatic rotary clutch 1300 may be governed in accordance with Equations 1-4, as described above in Subsection A. Note that the number of interfaces is nearly doubled from Subsection A for an equivalent number of plates since each rotor plate interfaces with two housing plates (one on each side—except for possibly the end plates) and each housing plate interfaces with two rotor plates (one on each side—except for possibly the end plates).

C. A Method for Configuring the Torque Resistance of a Shaft of an Electrostatic Rotary Clutch FIG. 21 shows a flowchart 2100 of a method for configuring a torque resistance of a shaft of an electrostatic rotary clutch, according to an example embodiment. In an embodiment, flowchart 2100 may be implemented by an electrostatic rotary clutch 2202, as shown in FIG. 22. FIG. 22 is a block diagram of a system 2200 comprising an electrostatic rotary clutch 2202 coupled to a voltage controller 2204 in accordance with an example embodiment. Electrostatic rotary clutch 100 and electrostatic rotary clutch 1300 are examples of electrostatic rotary clutch 2202, as described above with reference to Subsections A and B, respectively. Voltage controller 2204 may be implemented via hardware (e.g., an electrical circuit device, an integrated circuit device, a central processing unit (CPU), a microcontroller, a microprocessor, and/or other physical hardware processor circuit), software, or combination thereof. For example, voltage controller 2204 may include a boost converter or other circuitry to achieve a relatively high voltage from a low voltage source such as a lithium-ion or AA battery. Voltage controller 2204 may also include an amplifier to allow a standard microcontroller to manipulate this voltage. Other structural and operational embodiments will be apparent to persons skilled in the relevant art(s) based on the following discussion regarding flowchart 2100 and system 2200 of FIG. 22.

Flowchart 2100 begins with step 2102. In step 2102, a first torque resistance for a shaft is configured by applying a first voltage difference across a plurality of first plates and a plurality of second plates axially mounted to the shaft and contained in a housing, each second plate of the plurality of second plates positioned adjacent to a corresponding first plate of the plurality of first plates to form a substantially parallel plurality of electrically-conductive plate pairs contained in the housing, each first plate of the plurality of first plates being rotationally-coupled to the housing, each second plate of the plurality of second plates being rotationally-coupled to the shaft, said applying the first voltage difference causing a first electrostatic adhesion between corresponding first and second plates of the substantially parallel plurality of electrically-conductive plate pairs.

For example, with reference to FIG. 22, voltage controller 2204 may provide a first voltage 2206 and a second voltage 2208 that is different than first voltage 2206 to electrostatic rotary clutch 2202. Electrostatic rotary clutch 2202 may apply the voltage difference across the plurality of first plates and the plurality of second plates axially mounted to the shaft and contained in the housing. For example, with reference to FIG. 10, electrostatic rotary clutch 100 may apply first voltage 2206 to a plurality of first plates (i.e., housing plates 300) and apply second voltage to a plurality of second plates (i.e., rotor plates 500) that are axially mounted to shaft 104 and contained in housing 102. As shown in FIGS. 10 and 11, each rotor plate 500 is positioned adjacent to housing plate 300 to form a substantially parallel plurality of electrically-conductive plate pairs contained in housing 102. Each housing plate 300 is rotationally-coupled to the housing (e.g., via rib-like structures 208A and 208B), and each rotor plate 500 is rotationally-coupled to shaft 104. The first voltage difference causes a first electrostatic adhesion between corresponding housing plates 300 and rotor plates 500.

At step 2104, a second torque resistance for the shaft is configured by applying a second voltage difference across the plurality of first plates and the plurality of second plates, said applying the second voltage difference causing a second electrostatic adhesion between corresponding first and second plates of the substantially parallel plurality of electrically-conductive plate pairs.

For example, with reference to FIG. 22, voltage controller 2204 may provide a third voltage 2210 and a fourth voltage 2212 that is different than third voltage 2210 to electrostatic rotary clutch 2202. With reference to FIG. 10, electrostatic rotary clutch 100 may apply third voltage 2210 to housing plates 300 and apply fourth voltage 2212 to rotor plates 500. The second voltage difference causes a second electrostatic adhesion between corresponding housing plates 300 and rotor plates 500.

In accordance with one or more embodiments, applying the first voltage difference comprises applying a first voltage to the shaft to be applied to each second plate of the plurality of second plates via the shaft. For example, with reference to FIGS. 10 and 22, first voltage 2206 is applied to housing plates 300, and second voltage 2208 is applied to rotor plates 500 via shaft 104. First voltage 2206 may be applied to housing plates 300 via rib-like structures 208A and/or 208B. For example, rib-like structures 208A and/or 208B may comprise a conductive metal at a surface that is engaged with housing plates 300.

In accordance with one or more embodiments, an inner surface of the housing comprises a plurality of grooves, the plurality of grooves formed to receive and hold stationary the first plate of each of the plurality of electrically-conductive plate pairs. For example, with reference to FIGS. 2 and 3, inner surface 202 of housing 102 comprises plurality of grooves 204, which are formed to receive and hold stationary housing plates 300.

In accordance with one or more embodiments, each first plate of the plurality of first plates has a first surface and each second plate of the plurality of second plates has a second surface facing the first surface, and at least one of the first surface or the second surface comprises a dielectric material. For example, with reference to FIG. 12, surface 1202 of housing plate 300 faces surface 504 of rotor plate 500, and surface 1202 comprises dielectric material 1202 and surface 504 comprises dielectric material 1208.

In accordance with one or more embodiments, each second plate of the plurality of second plates is positionally-fixed to the shaft. For example, with reference to FIG. 6, each of rotor plates 500 are positionally-fixed to shaft 104.

In accordance with one or more embodiments, the plurality of first plates and the plurality of second plates are each substantially circular in shape. For example, as shown in FIGS. 3, 5, and 15, housing plates 300, rotor plates 500, and housing plates 1500 are substantially circular.

In accordance with one or more embodiments, each first plate of the plurality of first plates and each second plate of the plurality of second plates are moveable laterally along a length of the shaft. For example, with reference to FIG. 16, housing plates 1500 and rotor plates 500 are moveable laterally along a length of shaft 1304.

In accordance with one or more embodiments, the first plates are rotatable relative to the shaft, and the second plates are rotatable relative to the housing. For example, with reference to FIG. 10, housing plates 500 are rotatable relative to shaft 104, and rotor plates 500 are rotatable relative to housing 102.

III. Example Embodiments

In one embodiment, an electrostatic rotary clutch comprises: a shaft; a substantially parallel plurality of electrically-conductive plate pairs axially mounted to the shaft; and a housing containing the plurality of electrically-conductive plate pairs and at least a portion of the shaft, each of the plurality of electrically-conductive plate pairs comprising a first plate and a second plate adjacent to the first plate such that the plurality of electrically-conductive plate pairs comprises a plurality of first plates and second plates, each first plate of the plurality of the electrically-conductive plate pairs rotationally-coupled to the housing, each second plate of the plurality of electrically-conductive plate pairs rotationally-coupled to the shaft, the plurality of electrically-conductive plate pairs configured to cause an electrostatic adhesion between the first plate and the second plate of each of the plurality of electrically-conductive plate pairs based at least in part on a voltage difference applied across the plurality of first plates and the plurality of second plates.

In an embodiment, an inner surface of the housing comprises a plurality of grooves formed to receive and hold stationary the first plate of each of the plurality of electrically-conductive plate pairs.

In an embodiment, each first plate of the plurality of electrically-conductive plate pairs has a first surface and each second plate of the plurality of electrically-conductive plate pairs has a second surface facing the first surface, the electrostatic rotary clutch further comprising: a dielectric material on at least one of the first surface or the second surface.

In an embodiment, each second plate of the plurality of electrically-conductive plate pairs is positionally-fixed to the shaft.

In an embodiment, the plurality of first plates and the plurality of second plates are each substantially circular in shape.

In an embodiment, the plurality of first plates is rotatable relative to the shaft, and the plurality of second plates is rotatable relative to the housing.

In an embodiment, a method comprises: configuring a first torque resistance for a shaft by applying a first voltage difference across a plurality of first plates and a plurality of second plates axially mounted to the shaft and contained in a housing, each second plate of the plurality of second plates positioned adjacent to a corresponding first plate of the plurality of first plates to form a substantially parallel plurality of electrically-conductive plate pairs contained in the housing, each first plate of the plurality of the first plates being rotationally-coupled to the housing, each second plate of the plurality of second plates being rotationally-coupled to the shaft, said applying the first voltage difference causing a first electrostatic adhesion between corresponding first and second plates of the parallel plurality of electrically-conductive plate pairs; and configuring a second torque resistance for the shaft by applying a second voltage difference across the plurality of first plates and the plurality of second plates, said applying the second voltage difference causing a second electrostatic adhesion between corresponding first and second plates of the substantially parallel plurality of electrically-conductive plate pairs.

In an embodiment, said applying the first voltage difference comprises applying a first voltage to the shaft to be applied to each second plate of the plurality of second plates via the shaft.

In an embodiment, an inner surface of the housing comprises a plurality of grooves, the plurality of grooves formed to receive and hold stationary the first plate of each of the plurality of electrically-conductive plate pairs.

In an embodiment, each second plate of the plurality of second plates is positionally-fixed to the shaft.

In an embodiment, the plurality of first plates and the plurality of second plates are each substantially circular in shape.

In an embodiment, each first plate of the plurality of first plates and each second plate of the plurality of second plates are moveable laterally along a length of the shaft.

In an embodiment, the plurality of first plates is rotatable relative to the shaft, and the plurality of second plates is rotatable relative to the housing.

In another embodiment, an electrostatic rotary clutch comprises a shaft; a substantially parallel plurality of housing plates axially mounted to the shaft; a substantially parallel plurality of rotor plates axially mounted to the shaft; and a housing containing the plurality of housing plates and the plurality of rotor plates and at least a portion of the shaft, each housing plate of the plurality of housing plates positioned adjacently to at least one rotor plate of the plurality of rotor plates, each housing plate of the plurality of housing plates rotationally-coupled to the housing and rotatable relative to the shaft, each rotor plate of the plurality of rotor plates rotationally-coupled to the shaft and rotatable relative to the housing, the plurality of housing plates and the plurality of rotor plates configured to cause an electrostatic adhesion between each housing plate of the plurality of housing plates and at least one rotor plate of the plurality of rotor plates positioned adjacently to each housing plate based at least in part on a voltage difference applied across the plurality of housing plates and the plurality of rotor plates.

In an embodiment, the housing comprises a plurality of grooves, the plurality of grooves adapted and formed to receive and hold the plurality of housing plates.

In an embodiment, the plurality of housing plates and the plurality of rotor plates are further configured to cause an electrostatic adhesion between each rotor plate of the plurality of rotor plates and at least one housing plate of the plurality of housing plates positioned adjacently to each rotor plate based at least in part on a voltage difference applied across the plurality of housing plates and the plurality of rotor plates.

In an embodiment, the plurality of housing plates and plurality of rotor plates are moveable laterally along a length of the shaft.

In an embodiment, the plurality of housing plates and the plurality of rotor plates are substantially circular in shape.

IV. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the subject matter of the embodiments described herein, as defined in the appended claims. Accordingly, the breadth and scope of the disclosed embodiments should not be limited by any of the above-described exemplary embodiments, but should be defined only in accordance with the following claims and their equivalents.

What is claimed is:

1. An electrostatic rotary clutch, comprising:
a shaft;

a substantially parallel plurality of electrically-conductive plate pairs axially mounted to the shaft; and a housing containing the plurality of electrically-conductive plate pairs and at least a portion of the shaft, each of the plurality of electrically-conductive plate pairs comprising a first plate and a second plate adjacent to the first plate such that the plurality of electrically-conductive plate pairs comprises a plurality of first plates and second plates, each first plate of the plurality of the electrically-conductive plate pairs rotationally-coupled to the housing, each second plate of the plurality of electrically-conductive plate pairs rotationally-coupled to the shaft, and the plurality of electrically-conductive plate pairs configured to cause an electrostatic adhesion between the first plate and the second plate of each of the plurality of electrically-conductive plate pairs, such that the second plate is pulled towards the first plate that causes a frictional force therebetween, based at least in part on a voltage difference applied across the plurality of first plates and the plurality of second plates.

2. The electrostatic rotary clutch of claim 1, wherein an inner surface of the housing comprises a plurality of grooves formed to receive and hold stationary the first plate of each of the plurality of electrically-conductive plate pairs.

3. The electrostatic rotary clutch of claim 1, wherein each first plate of the plurality of electrically-conductive plate pairs has a first surface and each second plate of the plurality of electrically-conductive plate pairs has a second surface facing the first surface, the electrostatic rotary clutch further comprising:

a dielectric material on at least one of the first surface or the second surface.

4. The electrostatic rotary clutch of claim 1, wherein each second plate of the plurality of electrically-conductive plate pairs is positionally-fixed to the shaft.

5. The electrostatic rotary clutch of claim 1, wherein the plurality of first plates and the plurality of second plates are each substantially circular in shape.

6. The electrostatic rotary clutch of claim 1, wherein the plurality of first plates and the plurality of second plates are moveable laterally along a length of the shaft.

7. The electrostatic rotary clutch of claim 1, wherein the plurality of first plates is rotatable relative to the shaft, and the plurality of second plates is rotatable relative to the housing.

8. A method, comprising:

configuring a first torque resistance for a shaft by applying a first voltage difference across a plurality of first plates and a plurality of second plates axially mounted to the shaft and contained in a housing, each second plate of the plurality of second plates positioned adjacent to a corresponding first plate of the plurality of first plates to form a substantially parallel plurality of electrically-conductive plate pairs contained in the housing, each first plate of the plurality of the first plates being rotationally-coupled to the housing, each second plate of the plurality of second plates being rotationally-coupled to the shaft, said applying the first voltage difference causing a first electrostatic adhesion between corresponding first and second plates of the substantially parallel plurality of electrically-conductive plate pairs; and configuring a second torque resistance for the shaft by applying a second voltage difference across the plurality of first plates and the plurality of second plates, said applying the second voltage difference causing a second electrostatic adhesion between corresponding first and second plates of the substantially parallel plurality of electrically-conductive plate pairs such that second plates are pulled towards the corresponding first plates, thereby causing a frictional force therebetween.

9. The method of claim 8, wherein said applying the first voltage difference comprises applying a first voltage to the shaft to be applied to each second plate of the plurality of second plates via the shaft.

10. The method of claim 8, wherein an inner surface of the housing comprises a plurality of grooves, the plurality of grooves formed to receive and hold stationary the first plate of each of the plurality of electrically-conductive plate pairs.

11. The method of claim 8, wherein each first plate of the plurality of first plates has a first surface and each second plate of the plurality of second plates has a second surface facing the first surface, and at least one of the first surface or the second surface comprises a dielectric material.

12. The method of claim 8, wherein each second plate of the plurality of second plates is positionally-fixed to the shaft.

13. The method of claim 8, wherein the plurality of first plates and the plurality of second plates are each substantially circular in shape.

14. The method of claim 8, wherein each first plate of the plurality of first plates and each second plate of the plurality of second plates are moveable laterally along a length of the shaft.

15. The method of claim 8, wherein the plurality of first plates is rotatable relative to the shaft, and the plurality of second plates is rotatable relative to the housing.

16. An electrostatic rotary clutch, comprising:

a shaft;

a substantially parallel plurality of housing plates axially mounted to the shaft;

a substantially parallel plurality of rotor plates axially mounted to the shaft; and a housing containing the plurality of housing plates and the plurality of rotor plates and at least a portion of the shaft, each housing plate of the plurality of housing plates positioned adjacently to at least one rotor plate of the plurality of rotor plates, each housing plate of the plurality of housing plates rotationally-coupled to the housing and rotatable relative to the shaft, each rotor plate of the plurality of rotor plates rotationally-coupled to the shaft and rotatable relative to the housing, and the plurality of housing plates and the plurality of rotor plates configured to cause an electrostatic adhesion between each housing plate of the plurality of housing plates and at least one rotor plate of the plurality of rotor plates positioned adjacently to each housing plate, such that each rotor plate of the plurality of rotor plates are pulled towards at least one housing plate of the plurality of housing plates adjacently placed thereto that causes a frictional force therebetween, based at least in part on a voltage difference applied across the plurality of housing plates and the plurality of rotor plates.

17. The electrostatic rotary clutch of claim 16, wherein the housing comprises a plurality of grooves, the plurality of grooves adapted and formed to receive and hold the plurality of housing plates.

18. The electrostatic rotary clutch of claim 16, wherein the plurality of housing plates and plurality of rotor plates are moveable laterally along a length of the shaft.

19. The electrostatic rotary clutch of claim 16, wherein the plurality of housing plates and the plurality of rotor plates are substantially circular in shape.

20. The electrostatic rotary clutch of claim 16, wherein each housing plate of the plurality of housing plates has a first surface and each rotor plate of the plurality of rotor plates has a second surface facing the first surface, the electrostatic rotary clutch further comprising:
  a dielectric material on at least one of the first surface or the second surface.

* * * * *